US007900603B2

(12) United States Patent
Hasegawa et al.

(10) Patent No.: US 7,900,603 B2
(45) Date of Patent: Mar. 8, 2011

(54) AUTOMOBILE-USE HIGH PRESSURE FUEL INJECTION ACCUMULATOR-DISTRIBUTOR AND METHOD OF PRODUCTION OF THE SAME

(75) Inventors: Yasushi Hasegawa, Futtsu (JP); Ryuichi Honma, Futtsu (JP); Yutaka Takagi, Hashima (JP)

(73) Assignees: Nippon Steel Corporation, Tokyo (JP); Fukujukogyo Co., Ltd., Gifu (JP)

( * ) Notice: Subject to any disclaimer, the term of this patent is extended or adjusted under 35 U.S.C. 154(b) by 468 days.

(21) Appl. No.: 11/989,844

(22) PCT Filed: Jul. 31, 2006

(86) PCT No.: PCT/JP2006/315555

§ 371 (c)(1), (2), (4) Date: Jan. 31, 2008

(87) PCT Pub. No.: WO2007/015566

PCT Pub. Date: Feb. 8, 2007

(65) Prior Publication Data

US 2010/0095934 A1 Apr. 22, 2010

(30) Foreign Application Priority Data

Aug. 4, 2005 (JP) ................................ 2005-227121
Aug. 4, 2005 (JP) ................................ 2005-227182
Dec. 28, 2005 (JP) ................................ 2005-378183

(51) Int. Cl.
*F02M 69/46* (2006.01)
*F16L 19/00* (2006.01)

(52) U.S. Cl. .......................... 123/456; 123/468; 285/354

(58) Field of Classification Search .................. 123/456, 123/468, 469, 470; 29/890.06, 890.09, 890.14, 29/890.141, 890.148, 890.149; 285/354, 285/125.1, 189

See application file for complete search history.

(56) References Cited

U.S. PATENT DOCUMENTS 5,072,710 A 12/1991 Washizu (Continued)

FOREIGN PATENT DOCUMENTS

EP 0 866 221 9/1998

(Continued)

OTHER PUBLICATIONS

European Search Report dated Sep. 23, 2010 issued in corresponding European Application No. EP 06 78 2400.

*Primary Examiner* — Thomas N Moulis
(74) *Attorney, Agent, or Firm* — Kenyon & Kenyon LLP

(57) ABSTRACT

An automobile-use high pressure fuel injection accumulator-distributor comprised of a body of an automobile-use high pressure fuel injection accumulator-distributor to which pipe attachment holders for attaching fuel distribution pipes for distributing fuel to injection nozzles at an equal pressure are joined by liquid phase diffusion bonding etc., wherein each holder is comprised of a tube part at the pipe side and a partial cone-shaped skirt at the end of the rail body side, each holder skirt has a shape spreading in a partial cone shape toward the joint face end with an angle from the holder tube part side face of 10° or more in a range of a length of 2 mm or more in the holder axial direction at the outer circumference of the end of the holder at the joint face side, the rail body has holder joint position determining guide grooves at its holder joint positions, each guide groove is comprised of a groove inner circumferential wall of a size enabling engagement with a holder joint inner circumference, a groove bottom forming a joint face with the holder, and a groove outer circumferential wall of a partial cone shape bulging out to the inner side parallel to the holder skirt from the groove bottom toward the holder side at a depth of 2 mm or more, and a metal ring is plastically deformed and press-fit into a clearance of 0.5 mm or more between each holder skirt and the groove outer circumferential wall and parallel to the joint face.

16 Claims, 15 Drawing Sheets

U.S. PATENT DOCUMENTS

| | | | | | |
|---|---|---|---|---|---|
| 5,120,084 | A * | 6/1992 | Hashimoto | 285/133.11 |
| 5,169,182 | A * | 12/1992 | Hashimoto | 285/332.2 |
| 5,957,507 | A * | 9/1999 | Asada | 285/189 |
| 6,126,208 | A * | 10/2000 | Asada et al. | 285/133.4 |
| 6,463,909 | B2 * | 10/2002 | Asada et al. | 123/456 |
| 6,698,801 | B1 * | 3/2004 | Boecking | 285/288.1 |
| 6,736,431 | B2 * | 5/2004 | Jung et al. | 285/288.1 |
| 6,959,695 | B2 * | 11/2005 | Warner et al. | 123/456 |
| 7,114,489 | B2 * | 10/2006 | Wenke et al. | 123/456 |
| 7,125,051 | B2 * | 10/2006 | Usui et al. | 285/197 |
| 7,213,577 | B2 * | 5/2007 | Hummel et al. | 123/469 |
| 7,246,601 | B2 * | 7/2007 | Yamamoto et al. | 123/456 |
| 7,318,418 | B2 * | 1/2008 | Usui et al. | 123/468 |
| 7,431,781 | B2 * | 10/2008 | Usui et al. | 148/643 |
| 7,568,736 | B2 * | 8/2009 | Asada | 285/354 |
| 2005/0146134 | A1 | 7/2005 | Usui | |
| 2008/0042434 | A1 * | 2/2008 | Kenny | 285/354 |

FOREIGN PATENT DOCUMENTS

| | | | |
|---|---|---|---|
| EP | 1 378 658 | | 1/2004 |
| JP | 2-144662 | | 12/1990 |
| JP | 10-259772 | A | 9/1998 |
| JP | 11-2165 | A | 1/1999 |
| JP | 2001-059464 | | 3/2001 |
| JP | 2002-086279 | | 3/2002 |
| JP | 2002-263857 | | 9/2002 |
| JP | 2003-56428 | A | 2/2003 |
| JP | 2003-504561 | A | 2/2003 |
| JP | 2003-214291 | A | 7/2003 |
| JP | 2005-147075 | A | 6/2005 |

* cited by examiner (a)

(b)

AUTOMOBILE-USE HIGH PRESSURE FUEL INJECTION ACCUMULATOR-DISTRIBUTOR AND METHOD OF PRODUCTION OF THE SAME

TECHNICAL FIELD

The present invention relates to an automobile-use high pressure fuel injection accumulator-distributor known in general as a "common rail" and a method of production of the same. In particular, it relates to an automobile-use high pressure fuel injection accumulator-distributor able to withstand pressures over an internal pressure of 120 MPa produced by assembly using liquid phase diffusion bonding or another joining method at a 1000° C. or higher temperature, which automobile-use high pressure fuel injection accumulator-distributor has tolerance to a drop in strength occurring due to joint defects inevitably formed in a joint and, further, is excellent in durability with respect to internal pressure fatigue breakage from a joint arising due to pressure applied to the fuel, and a method of production of the same.

BACKGROUND ART

When using diesel fuel as automobile-use fuel, as technology for mixing the diesel fuel and air and uniformly injecting it into the combustion chambers to convert its explosive combustion effect most efficiently to drive power of the engine, the common rail system is used. This is technology for regulating the injection pressure of the fuel by electronic control and also is technology effective for reducing the harmful substances in the exhaust gas. In Europe, this system is made much use of in passenger cars. Due in part to this, the technology for the system has continued to be developed such as with the use of low impurity diesel fuel to obtain higher output, lower fuel consumption, and, further, larger torque.

The common rail system is mainly configured to pump fuel (diesel fuel) from a fuel tank, hold the pumped up fuel in a fuel accumulator called a "common rail" temporarily at a high pressure, transport the fuel under pressure from small sized discharge ports called "orifices" through pipes to the injection nozzles, mix the combustion-use air and fuel inside the nozzles, and uniformly inject the mixtures to the engine combustion chambers.

When discharging the fuel from the injection nozzles, the more uniformly the fuel is injected, the higher the combustion efficiency, and the higher pressure it is injected by, the easier the objective can be realized. That is, designing a fuel injection system injecting fuel at an extremely high pressure is an important technical challenge to be tackled in developing an automobile-use engine with small emission of harmful substances.

However, in current common rail systems, when the fuel is first stored under pressure in the accumulator, in the process leading to the discharge ports, the accumulator itself sometimes cannot withstand the fuel pressure and undergoes fatigue breakage due to the internal pressure.

To solve this problem, it is important to increase the strength of the steel material of the common rail. With this understanding, efforts are being made to deal with this by adjusting the chemical ingredients of the steel material and adjusting the heat treatment conditions in technical development. A common rail system sufficiently reliable up to injected fuel pressures of 120 MPa has already been commercialized.

A common rail for a high pressure over 120 MPa is at the present point of time formed integrally by hot forging, machined into a complicated shape, and further increased in strength by thermal refining, but as the strength of the material becomes higher, the shapeability deteriorates and the processing becomes difficult. Therefore, this method of production invites a large increase in costs. Further, development of technology raising the internal pressure of the common rail more is difficult.

At the present point of time, some common rails for high pressures of up to 150 MPa have been commercialized, but no method of production other than the combination of forging and machining has yet been established. Therefore, the problem of further raising the internal pressure of the common rail remains unsolved.

The inventors fundamentally reevaluated the method of production of a high pressure common rail and took note of the method of dividing each location into parts of simple shapes and mass producing and joining the parts to assemble finished products.

Techniques of forming parts by integral shaping and, when the shapes are complicated, dividing parts which should be produced by die forging, upset forging, casting, or partial cutting into parts of simple shapes for mass production and assembling these by liquid phase diffusion bonding are disclosed in Japanese Patent Publication (A) No. 2002-086279 and Japanese Patent Publication (A) No. 2002-263857.

These techniques utilize the advantage of precision joining technology of liquid phase diffusion bonding and realize parts of complicated shapes by joining, but liquid phase diffusion bonding has the property of advancing limited by the diffusion of the melting point lowering element, so it is necessary to continue to apply stress at the joint faces at a high temperature. The process time, even if just joining, is a relatively long one minute or more and the cost of the joining equipment is high, so these techniques have not spread in industrial use.

Further, Japanese Patent Publication (A) No. 2002-086279 and Japanese Patent Publication (A) No. 2002-263857 do not disclose technology enabling stable precision abutment of the joint faces even with local deformation of the joint faces when the stress applied to the joint faces does not become uniform due to problems with the joint fixtures or shape of the parts or further the processing precision or when the heating is not performed uniformly.

An automobile-use high pressure fuel injection accumulator-distributor is the most important location for obtaining reliability of an internal combustion engine. Due to the nature of the location where it is applied, the joint strength is strictly reflected in design. Therefore, for example, if an incomplete joint happens to occur due to a factor hard to manage in the joining process, that is, a factor such as the above, even for example if making the later inspection technology fail-safe, due to the production costs, the yield will not improve and the cost of the parts will skyrocket. Further, when lowering the precision of the inspection for production, the problem that sufficient reliability as an industrial product cannot be obtained remains unsolved.

Liquid phase diffusion bonding and other surface joining technology enable formation of precision joints, but conversely are sensitive to very slight abnormalities in the groove shapes, that is, parallel degree of the abutting groove faces and the distance between groove faces (also called "groove opening"). Problems remain to be solved in obtaining a joint with a high reliability.

DISCLOSURE OF THE INVENTION

Therefore, the present invention has as its object the provision of an automobile-use high pressure fuel injection accumulator-distributor obtained by producing holders required for connecting fuel tubes of a common rail, an automobile fuel injection part, to a rail body separately from the rail body, joining these by liquid phase diffusion bonding, resistance welding, or other joining technology or joining technology combining the same at a high temperature of 1000° C. or more, and raising the internal pressure fatigue resistance characteristic of the joints to thereby greatly improve the reliability of the part, and a method of production of the same.

The present invention was made for the purpose of preventing the above problem in the prior art, that is, the situation where even if the joints of the common rail body and the holders formed by joining technology satisfy the tensile strength or other mechanical characteristics, minor defects unable to be confirmed by nondestructive inspection etc. and defects overlooked due to human error make it impossible to realize the characteristics required in the part, in particular, the characteristic of durability against internal pressure fatigue over a long period of time and has as its gist the following:

(1) An automobile-use high pressure fuel injection accumulator-distributor comprised of a rail body of the automobile-use high pressure fuel injection accumulator-distributor to which pipe attachment holders for attachment of fuel distribution pipes distributing fuel to injection nozzles at equal pressures are joined by liquid phase diffusion bonding etc., the automobile-use high pressure fuel injection accumulator-distributor characterized in that each holder is comprised of a tube part at the pipe side and a partial cone-shaped skirt (tapered part) at the end of the rail body side, each holder skirt has a shape spreading in a partial cone shape toward the joint face end with an angle from the holder tube part side face of 10° or more in a range of a length of 2 mm or more in the holder axial direction at the outer circumference of the end of the holder at the joint face side, the rail body has holder joint position determining guide grooves at its holder joint positions, each guide groove is comprised of a groove inner circumferential wall of a size enabling engagement with a holder joint inner circumference, a groove bottom forming a joint face with the holder, and a groove outer circumferential wall of a partial cone shape bulging out to the inner side parallel to the holder skirt from the groove bottom toward the holder side at a depth of 2 mm or more, and a metal ring is plastically deformed and press-fit into a clearance of 0.5 mm or more between each holder skirt and the groove outer circumferential wall and parallel to the joint face, whereby a constant compressive stress is applied cold to the joint face.

(2) An automobile-use high pressure fuel injection accumulator-distributor as set forth in (1), wherein the metal ring has a yield strength of 100 MPa to 500 MPa.

(3) An automobile-use high pressure fuel injection accumulator-distributor as set forth in (1) or (2), characterized in that a plastic deformation start stress (elastic limit) at the time of drawing due to a composite force of a frictional resistance between a metal ring and the rail body or holder when the automobile-use high pressure fuel injection accumulator-distributor is subjected to internal pressure and a force acting to detach the holder and rigidity after plastic deformation and press-fitting of the metal ring is more than a maximum stress applied to the joint by the occurrence of the internal pressure.

(4) A method of production of an automobile-use high pressure fuel injection accumulator-distributor joining pipe attachment holders for attachment of fuel distribution pipes distributing fuel to injection nozzles at an equal pressure to a rail body of the automobile-use high pressure fuel injection accumulator-distributor by liquid phase diffusion bonding etc., the method of production of an automobile-use high pressure fuel injection accumulator-distributor characterized by:

forming each holder to an outside shape comprised of a tube part at the pipe side and a partial cone-shaped skirt at the end of the rail body side so that the holder skirt has a shape spreading in a partial cone shape toward the joint face end with an angle from the holder tube part side face of 10° or more in a range of a length of 2 mm or more in the holder axial direction at the outer circumference of the end of the holder at the joint face side, forming the rail body to have, at each holder joint position, a holder joint position determining guide groove comprised of a groove inner circumferential wall of a size enabling engagement with a holder joint inner circumference, a groove bottom forming a joint face with the holder, and a groove outer circumferential wall of a partial cone shape bulging out to the inner side parallel to the holder skirt from the groove bottom toward the holder side at a depth of 2 mm or more and at a distance from the holder skirt of 0.5 mm or more parallel to the joint face, then joining each holder and the rail body by liquid phase diffusion bonding etc. and further applying predetermined heat treatment, then plastic deforming and press-fitting a metal ring having the same inside diameter as the outside diameter of the holder tube part or having an inside diameter with an added clearance of 0.5 mm or less and having a thickness of 0.5 mm or more into a clearance of each holder skirt and groove outer circumferential wall cold so that the joint faces are given constant compressive stress.

(5) A method of production of an automobile-use high pressure fuel injection accumulator-distributor as set forth in (4), wherein each metal ring has a height the same as a depth of a guide groove or a greater height.

(6) An automobile-use high pressure fuel injection accumulator-distributor comprised of a rail body of the automobile-use high pressure fuel injection accumulator-distributor to which pipe attachment holders for attachment of fuel distribution pipes distributing fuel to injection nozzles at equal pressures are joined by liquid phase diffusion bonding etc., the automobile-use high pressure fuel injection accumulator-distributor characterized in that each holder has, at the end of its outer circumference at the joint face side, in a range of a length of 2 mm or more in the holder axial direction and around the entire circumference, a projecting part formed by the heat of the liquid phase diffusion bonding or other joining work and having an outside diameter 1 mm or more larger than the outer circumference of the body of the holder at each side, the rail body has holder joint position determining guide grooves at its holder joint positions, each guide groove is comprised of a groove inner circumferential wall of a size enabling engagement with a holder joint inner circumference, a groove bottom forming a joint face with the holder, and a groove outer circumferential wall having a size of a depth of 3 mm or more from the groove bottom and giving a clearance to the holder outside diameter of within 1.5 mm at one side, and each groove outer circumferential wall has a recessed part engaging with a projecting part of a holder outer circumferential surface at the joint face side end and increases a fastening force between the holder and rail body by an anchor effect due to engagement of the recessed part of the groove outer circumferential wall and the projecting part of the holder.

(7) An automobile-use high pressure fuel injection accumulator-distributor as set forth in (6), characterized in that the holders and rail body are comprised of a steel material having a tensile strength at room temperature of 800 MPa to 1500 MPa and, further, at 1000° C. or a higher temperature, of 200 MPa or less, and a plastic deformation start stress (elastic limit) at the time of drawing of a holder caused when the fuel injection system is subjected to internal pressure is 200 MPa or more in the range up to 100° C.

(8) A method of production of an automobile-use high pressure fuel injection accumulator-distributor joining pipe attachment holders for attachment of fuel distribution pipes distributing fuel to injection nozzles at an equal pressure to a rail body of the automobile-use high pressure fuel injection accumulator-distributor by liquid phase diffusion bonding etc., the method of production of an automobile-use high pressure fuel injection accumulator-distributor characterized by:

forming the rail body to have, at its holder joint positions, holder joint position determining guide grooves each comprised of a groove inner circumferential wall of a size enabling engagement with a holder joint inner circumference, a groove bottom forming a joint face with the holder, and a groove outer circumferential wall having a size of a depth of 3 mm or more from the groove bottom and giving a clearance to the holder outside diameter of within 1.5 mm at one side, forming each groove outer circumferential wall to have a recessed part having an outside diameter 1 mm or more larger at one side than the groove outer circumferential wall in a range of a length of 2 mm or more in the groove depth direction from the groove bottom and around the entire circumference, then joining each holder to the rail body by liquid phase diffusion bonding etc. during which, while the joint is exposed to a high temperature of 1000° C. or more, applying stress of 10 MPa or more to the holder as a whole for 0.1 to 60 seconds in addition to the time for application of stress required for the joining operation so as to thereby form, by hot plastic deformation, a projecting part having an outside diameter 1 mm or more larger at one side from the outer circumferential surface of the holder body in a range of length of 2 mm or more in the holder axial direction and around the entire circumference at the joint face side end of the outer circumference of the holder and engaging the projecting part with the recessed part of the groove outer circumferential wall to increase the fastening force between the holder and the rail body by the resultant anchor effect.

(9) A method of production of an automobile-use high pressure fuel injection accumulator-distributor as set forth in (8), characterized by forming each projecting part in advance at 1 mm or more at one side by machining, cold pressing or cold forging, hot forging or hot pressing and machining in combination and by making an angle formed by a holder outer circumferential surface at an inclined surface of the projecting part connected to a holder outer circumferential surface 45° or more.

(10) A method of production of an automobile-use high pressure fuel injection accumulator-distributor as set forth in (8) or (9), characterized in that the holders and rail body are comprised of a steel material having a tensile strength at room temperature of 800 MPa to 1500 MPa and, further, at 1000° C. or a higher temperature, of 200 MPa or less, and a plastic deformation start stress (elastic limit) at the time of drawing of a holder caused when the fuel injection system is subjected to internal pressure is 200 MPa or more in the range up to 100° C.

(11) An automobile-use high pressure fuel injection accumulator-distributor comprised of a rail body of the automobile-use high pressure fuel injection accumulator-distributor to which pipe attachment holders for attachment of fuel distribution pipes distributing fuel to injection nozzles at equal pressures are joined by liquid phase diffusion bonding etc., the automobile-use high pressure fuel injection accumulator-distributor characterized in that the rail body has cylindrical guide grooves at holder joint positions, each guide groove is comprised of an inner circumferential wall of a diameter enabling engagement with an inner circumference at the joint side of a holder, a bottom surface forming a weld joint surface with the holder, and an outer circumferential wall formed with an internal thread, each holder has a small diameter tube part at the pipe side, a step part forming a shoulder part at the middle, and a large diameter tube part at the rail body side to give it a coaxial two-step cylindrical outside shape, a reinforcing screw member having an inside surface shape fitting over the small diameter tube part and shoulder part of each holder to freely turn around them, having an external thread screwed into an internal thread of a guide groove of the rail body, having a holder axial direction dimension not exceeding the holder dimension is fit over each holder, and each reinforcing screw member is fastened to impart compressive stress to the joint faces of the bottom of a guide groove of the rail body with the holder.

(12) An automobile-use high pressure fuel injection accumulator-distributor as set forth in (11), wherein each shoulder part has a taper of 30 to 90° with the parallel part of the outer circumferential wall of the holder.

(13) An automobile-use high pressure fuel injection accumulator-distributor as set forth in (11) or (12), wherein each reinforcing screw member has a yield strength of 400 MPa or more.

(14) A method of production of an automobile-use high pressure fuel injection accumulator-distributor joining pipe attachment holders for attaching fuel distribution pipes for distributing fuel to injection nozzles at an equal pressure to a rail body of the automobile-use high pressure fuel injection accumulator-distributor by liquid phase diffusion bonding etc., the method of production of an automobile-use high pressure fuel injection accumulator-distributor characterized by:

forming each holder joint position of a rail body with a cylindrical guide groove comprised of an inside circumferential wall of a size enabling engagement with a holder joint inner circumference, a bottom forming a welding joint surface with the holder, and an outer circumferential wall having an internal thread, joining each holder with a coaxial two-step tube shape provided with a small diameter tube part at a pipe side and a large diameter tube part at a rail body side and provided with a shoulder part forming a step part between them to the bottom of the rail body using liquid phase diffusion bonding or another joining means, and fitting a reinforcing screw member having an inside surface shape fitting over the small diameter tube part and shoulder part of a holder to freely turn around them, having an external thread screwed into an internal thread of a guide groove of the rail body, having a holder axial direction dimension not exceeding the holder dimension over each holder and screwing it into an internal thread of the guide groove of the rail body and further fastening it to generate compressive stress at the welded joint faces of the bottom of the guide groove of the rail body with the holder.

(15) A method of production of an automobile-use high pressure fuel injection accumulator-distributor as set forth in (14), characterized in that a fastening torque of each reinforcing screw member is made a sum of the highest load stress to the joint faces generated when internal pressure is applied to the rail body and the fastening force when connecting the fuel distribution pipe by a metal touch seal.

(16) A method of production of an automobile-use high pressure fuel injection accumulator-distributor as set forth in (14) or (15), characterized by joining each holder with the rail body, then performing heat treatment to thermally refine the joint, then fastening a reinforcing screw member.

According to the present invention, when producing an automobile-use high pressure fuel injection accumulator-distributor in particular able to withstand a pressure of an internal pressure of over 120 MPa by assembly using liquid phase diffusion bonding or another joining method, it is possible to advantageously compensate for any drop in strength or breakage from a joint arising due to a joint defect inevitably arising in a joint.

Further, the situation where even if the joints of the common rail body and the holders of the automobile-use high pressure fuel injection accumulator-distributor formed by joining satisfy the tensile strength or other mechanical characteristics, minor defects unable to be confirmed by nondestructive inspection etc. and defects overlooked due to human error make it impossible to realize the characteristic of durability against pressure fatigue over a long period of time sometimes arises, but this situation can be prevented according to the present invention.

BEST MODE FOR WORKING THE INVENTION

When assembling an automobile-use high pressure fuel injection accumulator-distributor of an automobile-use fuel injection system (hereinafter sometimes referred to as a “common rail”) by joining parts, when it is not possible to detect defects inevitably latently present in joints with current technology, the present invention can reliably impart reliability to the joints of the common rail and make them function completely.

The present invention is comprised of a rail body housing the common rail accumulator structure and fuel branch paths and able to be connected to an internal pressure detection or pressure feedback mechanism (below also simply called a “rail”), connectors connecting the fuel distribution paths formed in the rail body and fuel distribution pipes to injection nozzles, that is, internal thread type or external thread type connection projections (below these parts being considered separate from the common rail, and the parts joined to the rail body being referred to as "pipe attachment holders" or simply "holders"), and metal rings for continuously imparting compressive residual stress to the joint faces of the rail body and holders after joining the holders to the rail and then performing the necessary thermal refining by heat treatment etc. (below also simply called "rings") or cylindrical thread type fastening members (below sometimes called "reinforcing screw members").

Figure 1:
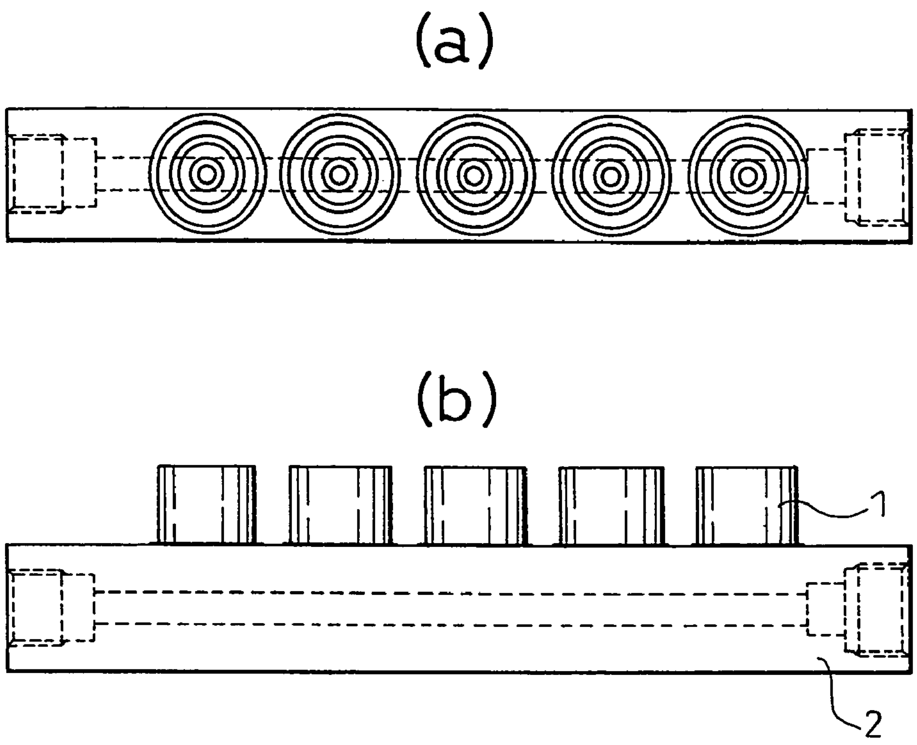
FIG. 1 gives view of the structure of an automobile-use high pressure fuel injection accumulator-distributor. (*a*) is a plan view and (*b*) is a front view.

FIG. 1 shows one form of a common rail (internal thread type holder type) and shows a rail body 2 and holders 1. (b) is a view showing an internal pipe of the common rail, while (a) is a view seen from the holder side. The common rail has a through hole inside it and orifices for distributing fuel in a direction perpendicular to the axial direction.

Note that here the common rail shown in FIG. 1 is used as an example for the explanation, but basically there is no limit to the shape of the fuel accumulator, that is, common rail. The cross-section may be rectangular like in the present case or circular. It is possible to suitably change the form of the common rail for the convenience of the supply of fuel to the engine and the layout of the pipes. However, the through hole and the branch tube structure are essential elements.

1) Aspects of Inventions of Claims 1 to 5

The configuration of the common rail and the method of imparting compressive residual stress to the joints will be explained in detail next.

Figure 2:
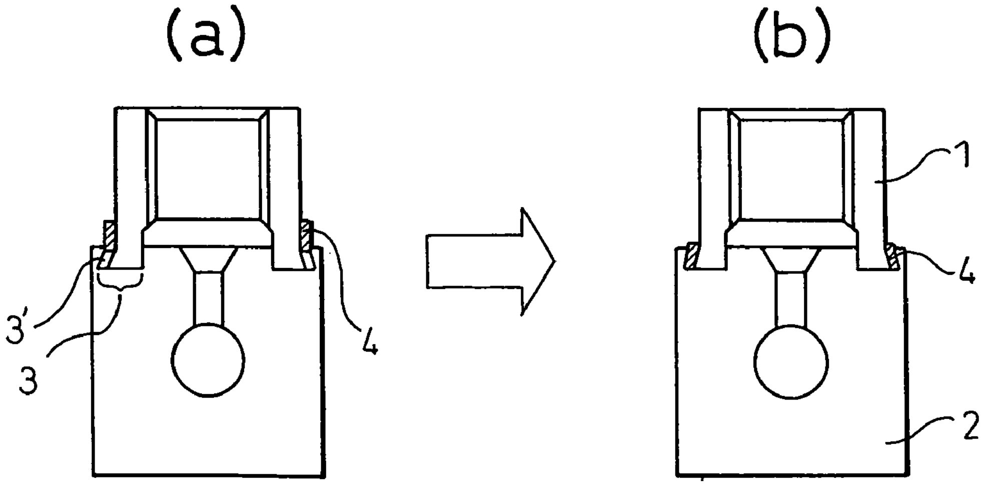
FIG. 2 gives views showing the procedure for press-fitting a metal ring. (*a*) shows the state before press-fitting and (*b*) shows the state after press-fitting.

FIG. 2 shows the cross-sectional structure of a common rail cut along the width direction and the method of press-fitting a metal ring. In FIG. 2, (a) shows the state before press-fitting a metal ring and (b) shows the state after press-fitting a metal ring.

That is, (1) The rail body and the holders are separately produced simply shaped parts and are not formed integrally.

(2) The rail body and the holders are joined by liquid phase diffusion bonding or other surface joining and are joined with a tensile strength equivalent to that of the base material. At the time of joining the parts, to connect the axial centers of the holders and the orifice parts of the rail body with a high precision and prevent fuel leakage occurring when connecting pipes by metal seals, the rail body is provided with grooves 3 for enabling the holders to be accurately joined without deviation in position.

Each guide groove has a depth of 2 mm or more from its functions. With a depth below this, the axial center of the holder will end up greatly deviating from the axial center of the pipe to be connected by a metal seal, fastening will not be achieved, fuel will partially leak and a pressure loss will occur, and the fuel injection function will no longer sufficiently operate in some cases. The inventors confirmed this experimentally.

(3) Each holder has an outwardly flaring skirt shapes having an inclination of 10° or more from the joint end of the holder to a height of 2 mm or more. To match with the inclined face, the guide groove of the rail body has a reverse inclination parallel to the inclination. These reverse inclination guide groove 3' has a metal ring 4 press into it.

Figure 3:
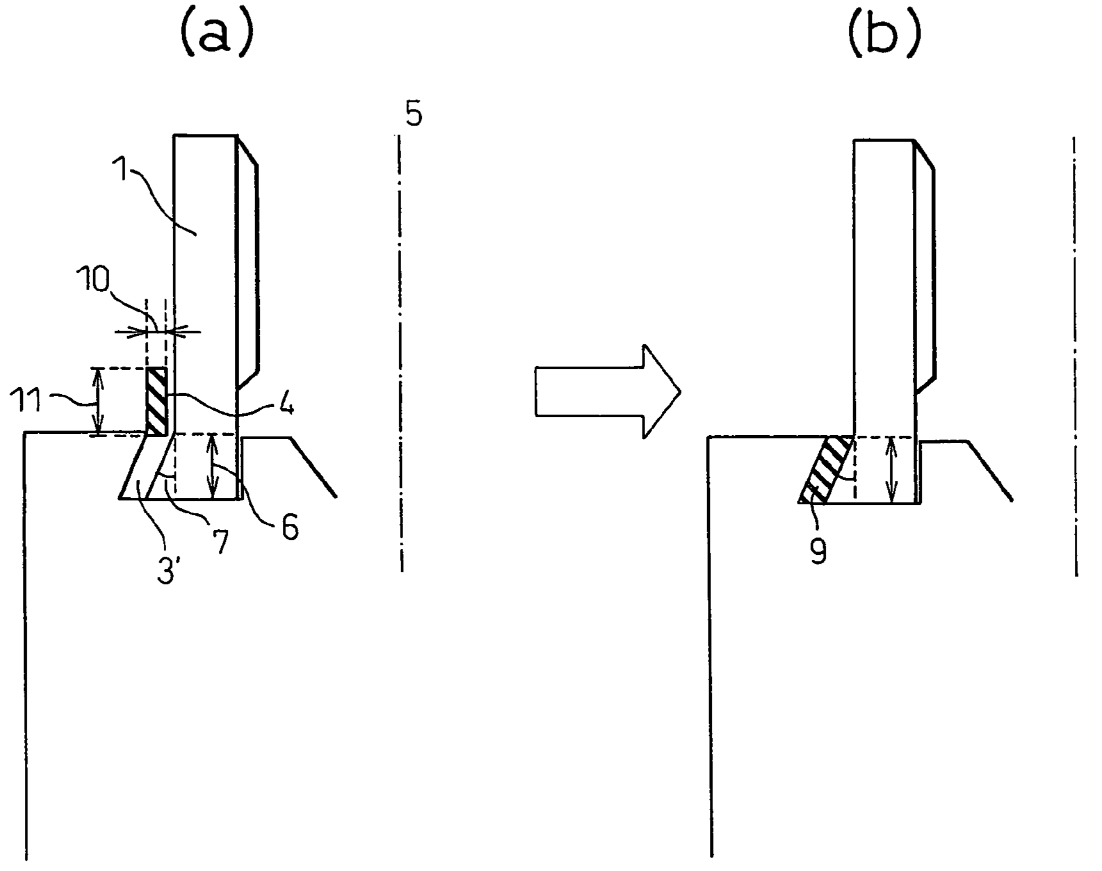
FIG. 3 is a view showing the shape of the joint of a pipe attachment holder and the state before and after insertion of a metal ring. (*a*) shows the state before press-fitting, while (*b*) shows the state after press-fitting.

(4) The press-fitting stress should be applied in accordance with the material of the metal rings. As shown in FIG. 3, stress of the yield strength or more is used to press fit each metal ring 4 into a clearance. Regarding the material of the metal ring, the inventors ran experiments based on the yield strength. With a yield strength of 100 MPa or less, at the drawing stress at the time of a load of the internal pressure stress produced in the holder, that is, the stress of less than 200 MPa calculated from the maximum internal pressure 2000 atm at the time of the experiments, the ring plastically flows and the holder detaches, so the lower limit of the yield strength of the metal ring was made 100 MPa.

The yield strength is not particularly limited in the upper limit value, but if too high, plastic deformation at the time of press-fitting becomes difficult and conversely the rail body or holder will plastically deform and the metal ring will not be able to impart residual stress to the joint, so the upper limit value of the yield strength was made 500 MPa. If raising the strengths of the holder and the rail body, no upper limit value need particularly be set for the yield strength.

(5) Each metal ring 4 is press-fit until completely filling the clearance between the holder and the rail body (see metal ring 9 of FIG. 3(*b*)). For this filling action, the height 11 of the ring and the groove depth may be calculated and measured in advance and the metal ring may be press-fit until the depth where it is considered it completely reaches the groove bottom. At this time, if the height 11 of the metal ring 4 is smaller than the groove depth, not only can't the completion of press-fitting be confirmed by the above method of calculation and measurement, but also press-fitting cannot be substantively be confirmed at all.

(6) The relationship between the actual press-fitting and the press-fitting stress can be confirmed by press-fitting a metal ring, then obtaining a cross-section by cutting. It was confirmed that the press-fitting conditions of (5) were sufficient.

(7) Each holder and the rail body can be joined by selecting sufficient joining conditions. If using nondestructive inspection to detect defects, the joint characteristics can be guaranteed using industrial safety parameters. However, small defects which cannot be detected by nondestructive inspection, defects which are extremely small compared with the wavelength of the ultrasonic waves emitted from the probe, and further various minor defects and weld cracks due to the welding method are sometimes overlooked. It is difficult to guarantee the joint characteristics 100%.

The characteristics required in a joint are fatigue characteristics able to withstand tensile stress repeatedly occurring in a direction perpendicular to the joint face at the time of fluctuation of internal pressure, but fatigue breakage due to accumulation of such repeated tensile stress is most difficult to predict. Therefore, this is the most important guarantee item in part design.

The object of the present invention is to prevent the fatigue breakage by applying compressive residual stress to each joint by, in the present invention, press-fitting a metal ring to impart a force component of the compressive residual stress in a direction perpendicular to the joint faces and thereby easing the fatigue conditions in an internal pressure fatigue environment.

However, to completely prevent fatigue breakage, it is necessary that the compressive residual stress applied to each joint in the present invention overcome the residual tensile stress occurring when fastening a pipe by a metal seal (fastening tensile stress) and the repeated tensile stress due to fluctuations in the applied internal pressure. Even if the internal pressure is high, so long as the sum of the fastening tensile stress and the maximum drawing stress due to the internal pressure does not exceed the compressive residual stress, any tensile stress occurring at a joint will not be continuous.

That is, it is sufficient that the total stress of the frictional resistance between each metal ring and rail body or holder occurring when the common rail is subjected to internal pressure and force acts drawing the holder and the rigidity after plastic deforming and press fitting the metal ring win and the stress at the joint faces always be at the compression side.

Of course, even if the stress of the joint faces is at the tension side, so long as the joint strength is at least double the tensile stress, the joint may be considered industrially reliable, but for reliably guaranteeing all parts, the conditions described in claim 4 are necessary.

Note that in the present invention, the holder skirts are made outwardly flaring shapes. The condition of imparting a taper of 10° or more to a height of 2 mm or more is based on the following experiments.

Here, to clearly show the shape of the joint ends, the vicinity of a joint shown in FIG. 2 is enlarged and shown in FIG. 3. Note that in the figure, 5 indicates the axial center position of a holder. In FIG. 3, (a) shows the state before press-fitting a metal ring, while (b) shows the state after press-fitting a metal ring.

The inventors set the distance 6 of each holder skirt (tapered part) from the joint end (height of holder skirt) to 2 mm, changed the angle 7 of the tapered part in various ways, and measured the stress at the time of drawing of the holder by a tensile tester. When assuming imparting an internal pressure of 2000 atm, the elastic limit of the drawing stress of a joint occurring at a holder can be calculated as being, at the maximum, about 200 MPa, so this value was used as the threshold value.

Figure 4:
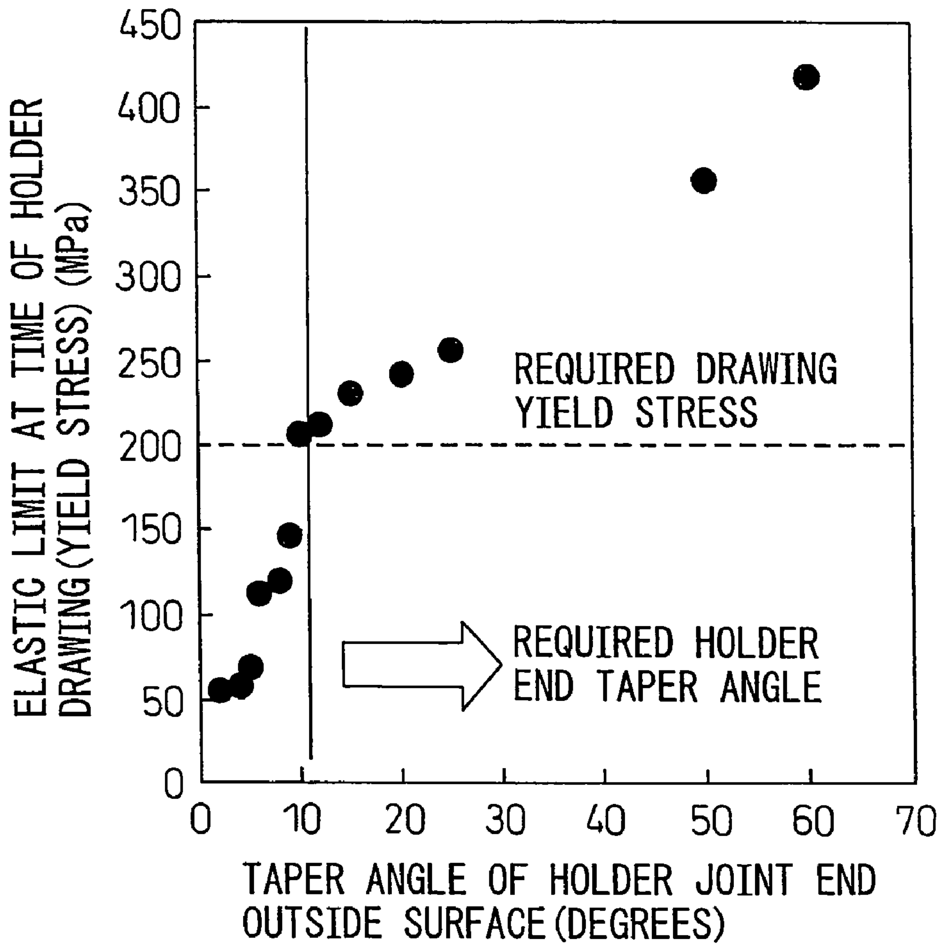
FIG. 4 shows the relationship between a taper angle of a pipe attachment holder skirt and deformation yield stress at the time of drawing.

FIG. 4 shows the relationship between the taper angle and the yield stress (elastic limit) at the time of drawing. As clear from FIG. 4, at a taper angle of 10°, the yield stress at the time of drawing (elastic limit) changes to 200 MPa or more. That is, to obtain a deformation start stress at the time of drawing of 200 MPa or more, the taper angle must be 10° or more. The inventors ran separate similar experiments on the relationship with the taper height up to a maximum of 5 mm and obtained substantially the same results as the results of the experiment for selecting the taper angle.

Figure 5:
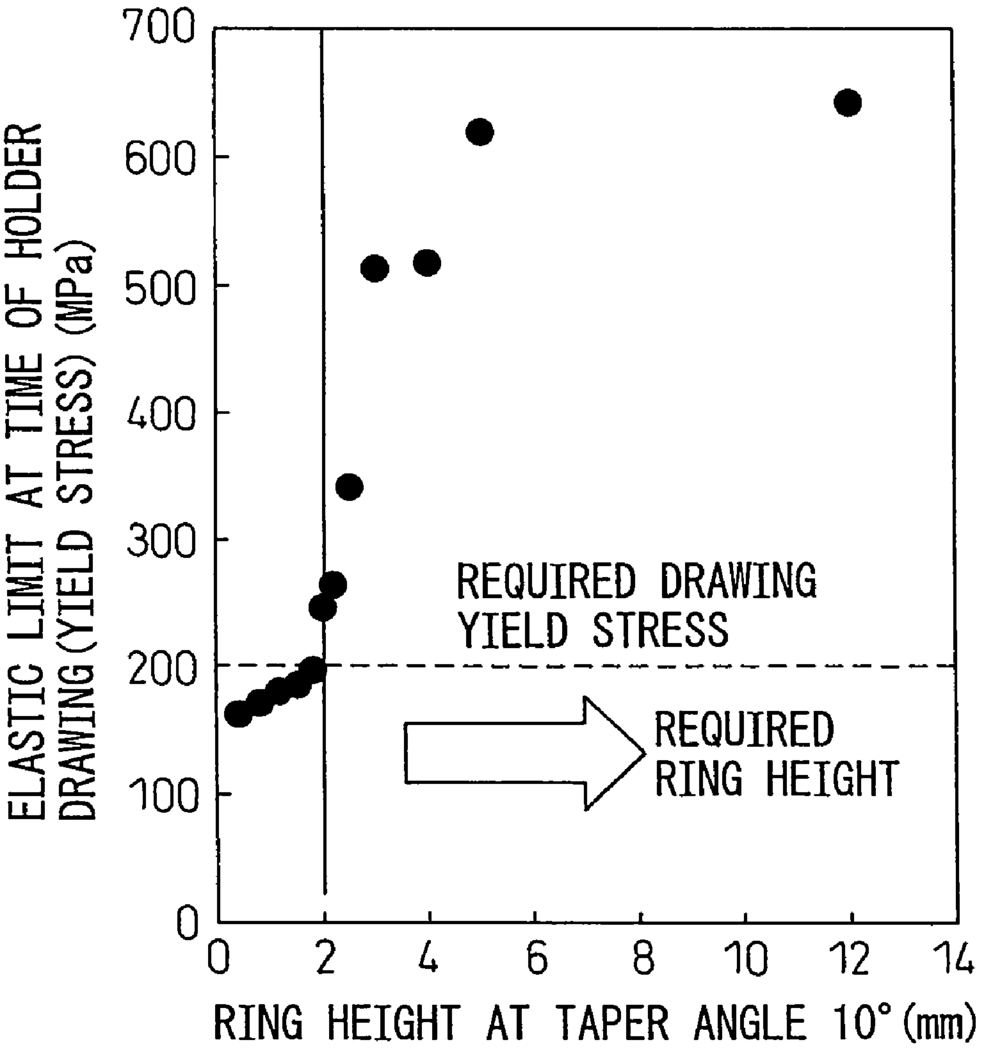
FIG. 5 is a view showing a ring height required when the taper angle of the pipe attachment holder skirt is 10°.

Further, FIG. 5 shows the relationship between the height of each metal ring and the yield stress at the time of drawing in the case of a taper angle of 10°. The height of the metal ring 11 (see FIG. 3) in this case is the same as the depth of the guide groove 3. The deeper the groove depth, the deeper the depth of the tapered part and the larger the contact area between the metal ring and the holder or rail body, so the greater the frictional force. That is, there is a necessary value to the height of the metal ring. In the current experimental results, it was learned that this is 2 mm or more.

Further, to impart sufficient rigidity, the thickness 10 of each metal ring 4 (see FIG. 3) has to be at least 0.5 mm. If thinner than this, partial plastic flow of the metal rings occurs and breakage occurs resulting in a holder drawing by a drawing stress of less than 200 MPa.

Note that when producing the rail body and the holders, the materials may be selected with reference to the internal pressure and the design maximum main stress of the common rail and may be suitably selected from ones having a tensile strength of 800 to 1500 MPa. In the case of high strength steel, if selecting high strength steel with a high cleanliness, it is possible to prevent destruction due to inclusions, so suitable materials should be selected from high cleanliness high strength steels. There are no restrictions regarding the chemical ingredients of the materials.

Further, when producing the common rail, the orifice sizes, the sizes of the main pipes in the internal accumulator region, etc. should be suitably selected in accordance with the targeted functions of the common rail. Selection of these does not hinder the effects of the present invention at all and conversely increases the degree of freedom of design of high pressure common rails and is effective in reducing weight etc. so enhances the effects of the present invention.

2) Aspects of Invention of Claims 6 to 10

Figure 6:
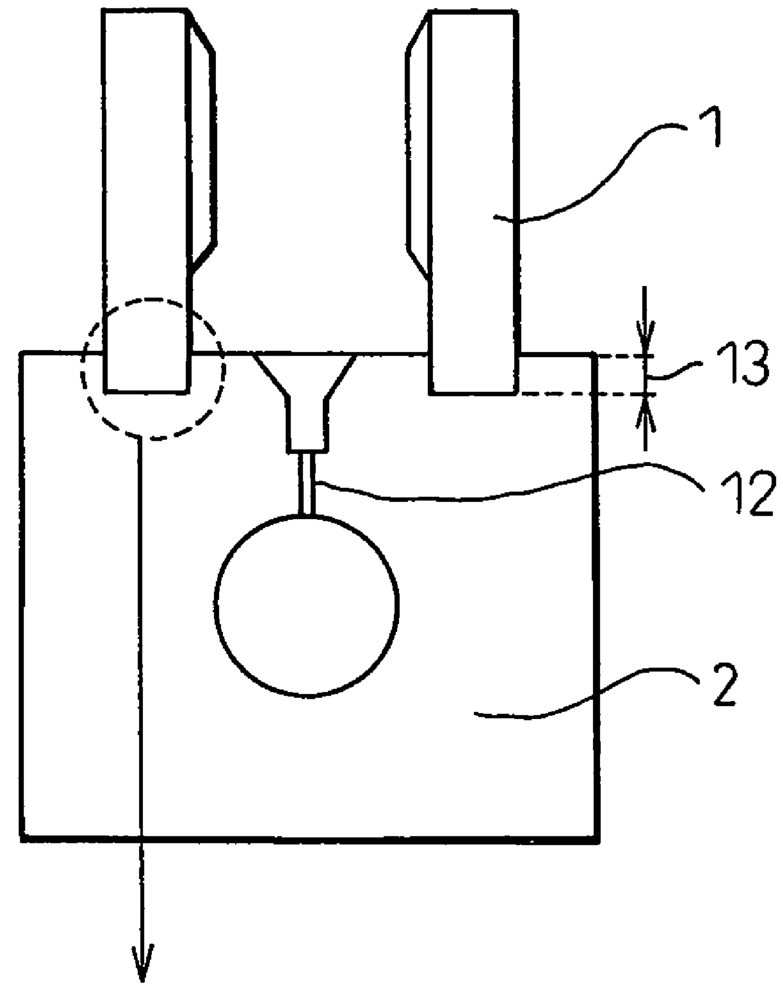
FIG. 6 is a view showing the state of attachment of a pipe attachment holder to a rail body. (*a*) shows the cross-section of an automobile-use high pressure fuel injection accumulator-distributor in the width direction, while (*b*) shows the joint enlarged.
Figure 6:
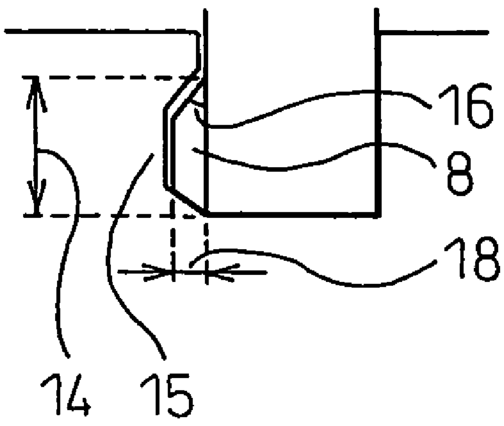
Figure 7:
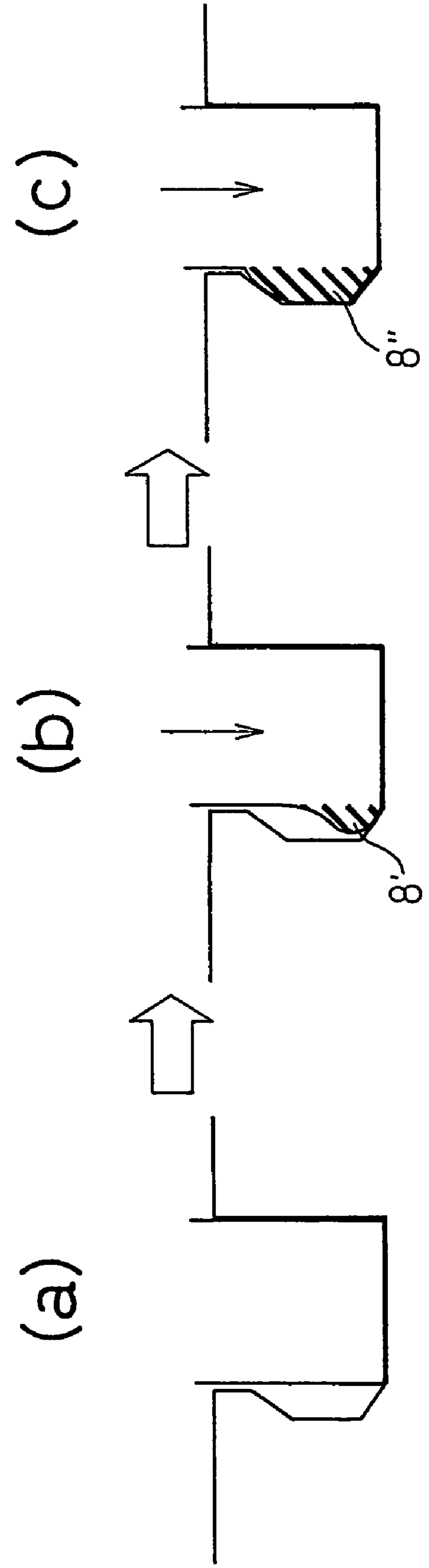
FIG. 7 is a view showing the process of applying stress to a joint end of a pipe attachment holder from above right after the joining work so as to cause plastic deformation at 1000° C. or more and form a projecting part. (*a*) shows the state A before the start of shaping, (*b*) shows the state B in the middle of the shaping, and (*c*) shows the state C after the end of the shaping.
Figure 8:
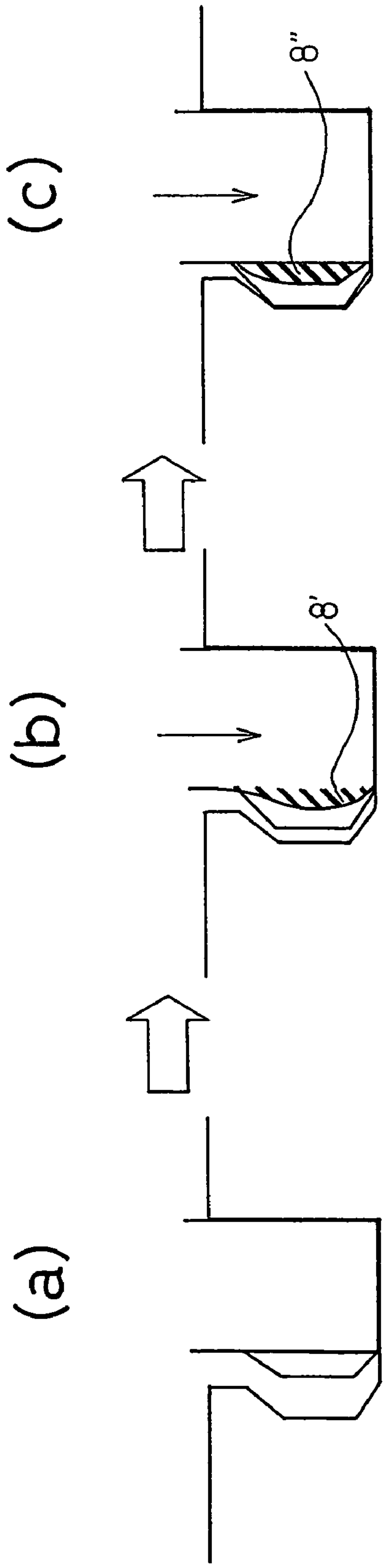
FIG. 8 is a view showing the process of processing the outer circumferential end face of a pipe attachment holder to a projecting part in advance, applying stress from above right after the joining work so as to cause plastic deformation at 1000° C. or more and make a projecting part bulge out, and making this engage with a recess in a groove outer circumferential wall of a rail body. (*a*) shows the state A before the start of shaping, (*b*) shows the state B in the middle of the shaping, (*c*) shows the state C after the end of the shaping.

FIG. 6 shows the cross-sectional structure of a common rail cut along the width direction. FIG. 7 shows the shaping of a projecting part by plastic deformation at the joint end, while FIG. 8 shows the engagement state of the joint in the case of forming the projecting part by machining in advance.

That is, (1) The rail body and each holder are separately produced parts for joining and assembly.

(2) The rail body and each holder are joined by liquid phase diffusion bonding or other surface joining with a tensile strength equivalent to that of the base material. At the time of joining the parts, to connect the holder and an orifice part 12 of the rail body with a high precision and prevent fuel leakage occurring when connecting a pipe by a metal seal, the rail body is provided with a guide groove for determining the joining position of the holder for enabling the holder to be accurately joined without deviation in position (see partially enlarged view (b) in FIG. 6).

Each guide groove has a depth 13 of 3 mm or more from its functions. With a depth below this, the axial center of the holder will end up greatly deviating from the axial center of the pipe to be connected by the metal seal, tight fastening will not be achieved at the time of fastening, fuel will partially leak and a pressure loss will occur, and the fuel injection function will no longer sufficiently operate in some cases.

Further, the projecting part at the outer surface of each holder at the welded joint face end of the holder and the recess 15 in the outer circumferential wall provided at the guide groove of the rail body and engaging with the projecting part (see partially enlarged view (b) in FIG. 6) sometimes are not sufficiently engaged after joining and therefore the drawing stress of the holder falls below 200 MPa. The inventors confirmed this experimentally.

(3) The 1 mm or more projecting part 8 formed at the outer circumferential surface of each holder at the joint end side must have a height 14 in the holder axial direction (see partially enlarged view (b) in FIG. 6) of 2 mm or more and not more than the guide groove depth of the rail body (13 in FIG. 6(*a*)).

When forming the projecting part 8 in advance by machining, the holder outer surface and the projecting part have to be connected by a taper surface with a taper angle 16 with respect to the outer wall of the holder of 45° or more. The rail body side must also be formed with a recess in the groove outer circumferential wall engaging with this projecting part.

The recess in the groove outer circumferential wall of the rail body and the tapered part of the projecting part of each holder improve the fastening force by the frictional force and the anchor effect due to the joining when drawing stress occurs in the holder. If the taper angle is less than 45°, when the height of the holder projecting part in the holder axial center direction is 2 mm, it is not possible geometrically to form a 1 mm projecting part in advance. Further, the shape of the recess in the groove outer circumferential wall of the rail body engaging with this is similarly limited.

Further, when the taper angle is substantially 90° or more, the rail body at the side of the recess at the groove outer circumferential wall of the rail body cannot be worked, so while the taper angle is not limited, a 90° or more taper angle is not practical.

(4) The engagement of each holder projecting part with a recess in the groove outer circumferential wall of the rail body is achieved, as shown in FIGS. 7(*a*) to (*c*), by high temperature plastic deformation utilizing preheating of 1000° C. or more at the time of joining. The projecting part reaches a final state 8" after a shaping process 8' by high temperature plastic deformation. Stress for the high temperature plastic deformation, in the case of liquid phase diffusion bonding, can be simultaneously imparted when applying stress to the joint grooves.

In the case of other welding (electrical resistance welding or friction welding), application of stress is essential, so the stress necessary for deformation of the joint is applied, then right after that plastic deformation is promoted for shaping to realize engagement between each holder projecting part and a recess in the groove outer circumferential wall of the rail body.

Achievement of this engagement was confirmed by observation of the cross-section after cutting the joint after engagement. By determining the magnitude of the stress and the timing of application of the stress based on the results of observation and controlling the stress or stress application timing by process control, a fastening force can be secured. Further, whether or not any clearance remains can be confirmed by ultrasonic inspection or X-ray inspection.

This stress and stress application timing are factors which may be suitably determined in accordance with need by the material of the common rail and the mechanical characteristics of the material at 1000° C. or more, in particular the deformation yield stress.

(5) If joining each holder and the rail body by selecting sufficient joining conditions and inspecting for defects by nondestructive inspection, it is possible to use industrial safety coefficients to guarantee the characteristics of the joints. However, sometimes small defects which cannot be detected by nondestructive inspection, extremely small defects compared with the wavelength of the ultrasonic waves emitted from the probe, and further various minor defects or weld cracks due to the welding method are overlooked. It is difficult to guarantee the joint characteristics 100%.

The characteristics required from each joint are fatigue characteristics able to withstand the tensile stress repeatedly occurring in the direction perpendicular to the joint faces at the time of fluctuation of the internal pressure, but fatigue breakage due to buildup of this repeated tensile stress is the most difficult to predict and is the most important guarantee item in the design of parts for a common rail.

To prevent the fatigue breakage, in the present invention, each joint is provided with a holder projecting part and a recess in the groove outer circumferential wall of the rail body. The anchor effect due to engagement of these secures a sufficient fastening force, but to completely prevent fatigue breakage, it is necessary that the plastic deformation start stress at the time of holder drawing (elastic limit) overcome the residual tensile stress occurring when fastening the pipe by a metal seal and the repeated tensile stress occurring due to fluctuations in the internal pressure applied to the same. Further, if considering the fatigue breakage, the plastic deformation start stress at the time of drawing must be two times the holder drawing stress applied to the joint.

Even if the internal pressure becomes high, if the fastening force exceeds two times the maximum yield stress at the time of drawing of the holder due to internal pressure, fatigue breakage theoretically will not occur. The plastic deformation start stress at the time of drawing of a holder and rail body fastened by the method of the present invention, even if there are minor defects in the joint faces, is dispersed at two surfaces rather than just the joint face generating the fastening force, so the joint of the present invention is superior in the internal pressure fatigue characteristics compared with a conventional welded common rail not having any projecting parts.

(6) The material of each holder is not particularly limited in chemical ingredients. However, a high pressure common rail requires superior internal pressure fatigue characteristics. For this reason, the tensile strength of the material must be made 800 MPa or more in the state of the final product after completion of assembly of the common rail by suitably selecting the chemical ingredients, heat treatment or other thermal refining, cold working, etc.

The upper limit of the tensile strength was made 1500 MPa so that embrittlement due to hydrogen would not occur since the present invention uses joining technology and envisioning the case where the very slight amount of hydrogen such as invading the joint at this part diffuses over a long distance and concentrates at the positions of generation of the maximum stress inside the common rail. The upper limit value was set for the tensile strength from the viewpoint of hydrogen embrittlement sensitivity.

Further, to enable the biggest feature of the present invention, that is, utilization of the excess heat right after joining to cause each holder end to plastically deform and substantially enable a projecting part to be shaped or protrude out, the strength of the steel material at 1000° C. or more (at 1000° C. or more, substantially the strength falls along with the rise of the temperature, so the 1000° C. tensile strength represents the strength) must be 200 MPa or less. The only materials having a high temperature strength over 200 MPa are ceramics or superhigh temperature special alloys, but this is an important requirement in the material specifications, so the upper limit value was set as 200 MPa.

This limitation on the material strength is predicated on the fact that if the plastic deformation start stress when evaluating the effect of the present invention explained above, that is, at the time of holder drawing (in actuality, a holder deforms in a direction perpendicular to the joint faces in a direction separating from the rail, so this is the stress in the state where only the joint strength of the joint prevents drawing of the holder (elastic limit)) is 200 MPa or more until the highest heating temperature of 100° C. which it is estimated a common rail carried in an engine is exposed to, each joined holder will not in practice detach from the joint due to the anchor effect of the projecting part at the joint end of the present invention and the joint strength of the joint.

Note that in the present invention, the shape of the projecting part provided at the outer circumferential surface of each holder at the joint face end is made a length of 1 mm or more in the outside diameter direction. Further, the limitation of the taper angle formed between the outer circumferential surface of the holder body and the inclined surface of the projecting part to 45° or more was determined based on the following experiment.

First, internal thread type holders having outside diameters of 24 mm and thicknesses of 6 mm were prepared so that the outside diameters of the projecting parts gradually increased in units of 0.1 mm from 24 mm.

Each corresponding holder joint position determining guide groove at the rail body side had an inside diameter of 17.8 mm, an outside diameter of 24.5 mm, and a depth of 3 mm. Further, a recess modeled on the holder projecting part was formed at each groove outer circumferential wall of the rail body to match with the test level of the outside diameter of the holder projecting part.

Further, holders not having any projecting parts at the holder outer circumferential surfaces and holder bodies changed in the recesses of the groove outer circumferential walls corresponding to the same in 0.1 mm units were prepared.

These parts were joined by liquid phase diffusion bonding or electrical resistance welding or a composite joining of resistance welding then liquid phase diffusion bonding so as to prepare prototypes of common rails. The plastic deformation start stress at the time of holder drawing was measured. Note that that the amount of deformation required when each holder projecting part completely engages with a recess is determined in advance by measuring the reduction in the holder height occurring when indirectly applying stress to the holder, finding the optimal value, and managing it by this reduced height.

Figure 9:
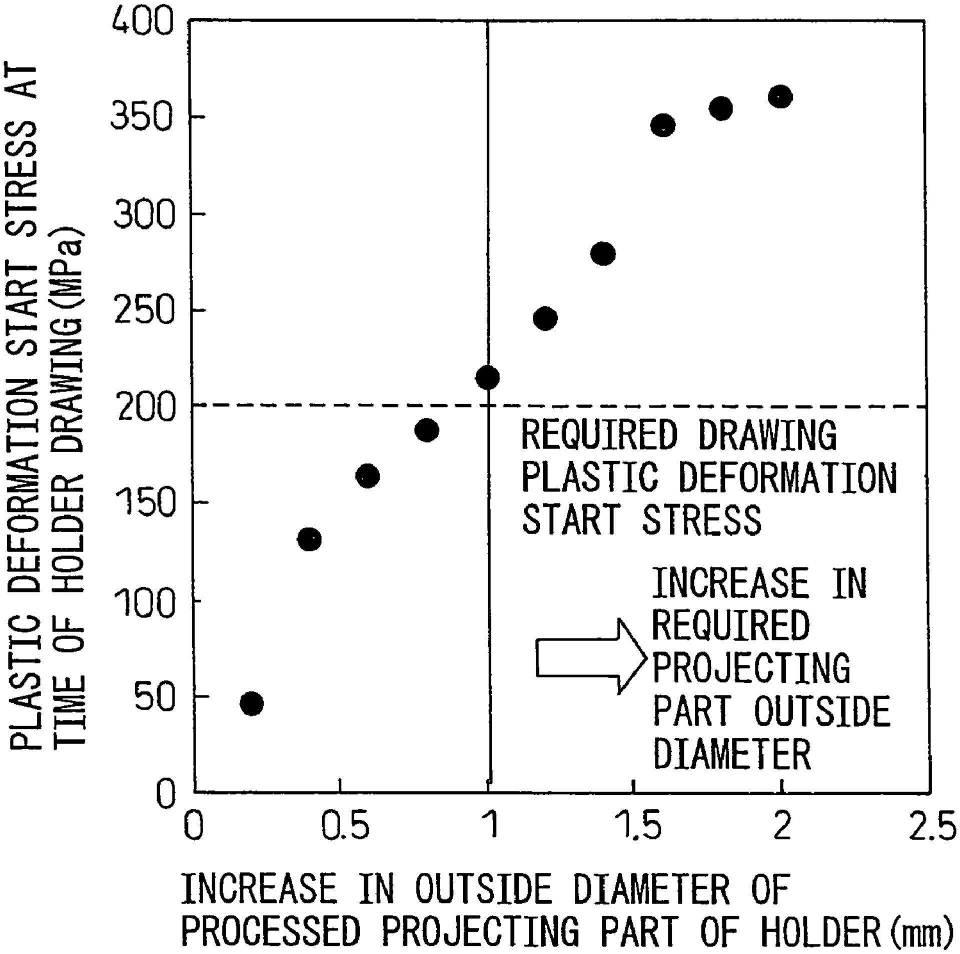
FIG. 9 is a view showing the relationship between the amount of increase of the projecting part formed at the pipe attachment holder from the outside diameter of the holder at one side of the outside diameter and the plastic deformation start stress at the time of drawing the holder.

FIG. 9 shows the relationship between the amount of increase of the initial projecting part from the outer circumferential surface of the holder parallel part at one side of the outside diameter in the case of providing the projecting part when cutting the holder and the plastic deformation start stress at the time of holder drawing (elastic limit). It is learned that when the amount of increase of the projecting part from the parallel part at one side from the outer circumferential surface of the parallel part is exactly 1 mm, the plastic deformation start stress at the time of drawing exceeds 200 MPa.

When using this data to machine this projecting part, the necessary amount of increase of the projecting part from the holder outside diameter at one side is set as 1 mm or more. Note that no limit is set for the amount of increase at one side, but if too excessive (substantively found to be 3 mm or more by experiments), the amount of cutting scraps at the time of advance machining will become too large and a problem will arise in the cost of the processing of the materials, so there is a limit. However, mechanically speaking, there is no substantive upper limit set.

Figure 10:
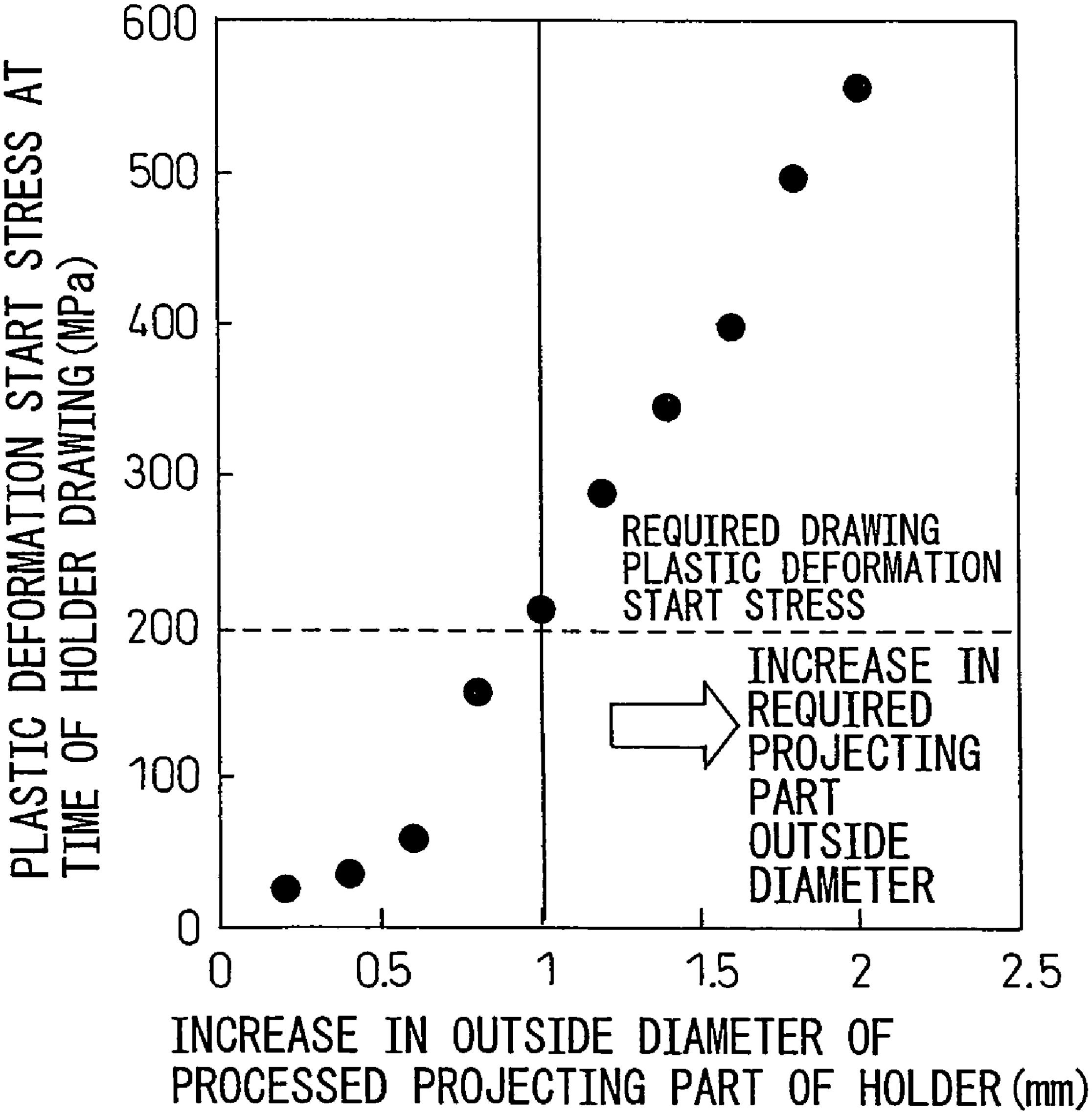
FIG. 10 is a view showing the relationship between the amount of increase of the projecting part from the outside diameter of the holder at one side of the outside diameter in the case of forming a projecting part at a pipe attachment holder by plastic deformation at the time of joining work and the plastic deformation start stress at the time of drawing the holder.

FIG. 10 shows the relationship between the results of actual measurement of the amount of projection, obtained by cutting open the common rail at the axial center position of a holder in the width direction after joining, when forming a projecting part by plastic deformation at the time of joining in the case of not providing a projecting part in advance and the plastic deformation start stress at the time of drawing of a holder in the case of the same amount of deformation.

Even when not providing a projecting part in advance, in the end, the plastic deformed part protrudes out to fit with the recess at the rail body side. With the same 1 mm increase in outside diameter of the projecting part, the plastic deformation start stress at the time of drawing of the holder exceeds 200 MPa.

In this case, the amount of plastic deformation of the joint end of the holder becomes larger compared with the case of forming the projecting part in advance. The change in height of the holder is larger, but the shape of the completed joint was similar to the case of providing the projecting part in advance. Even if the amount of plastic deformation differs, the shape of the projecting part is similar because the outer circumferential surface of the holder connected to the projecting part also increases in outside diameter due to plastic deformation.

3) Aspects of Invention of Claims 11 to 16

The configuration of the common rail of the present invention, the method of imparting compressive residual stress to a welded joint, and the method of engaging a reinforcing screw member to each holder necessary for obtaining the anchor effect of the holder will be explained using FIG. 1 and FIG. 11.

Figure 11:
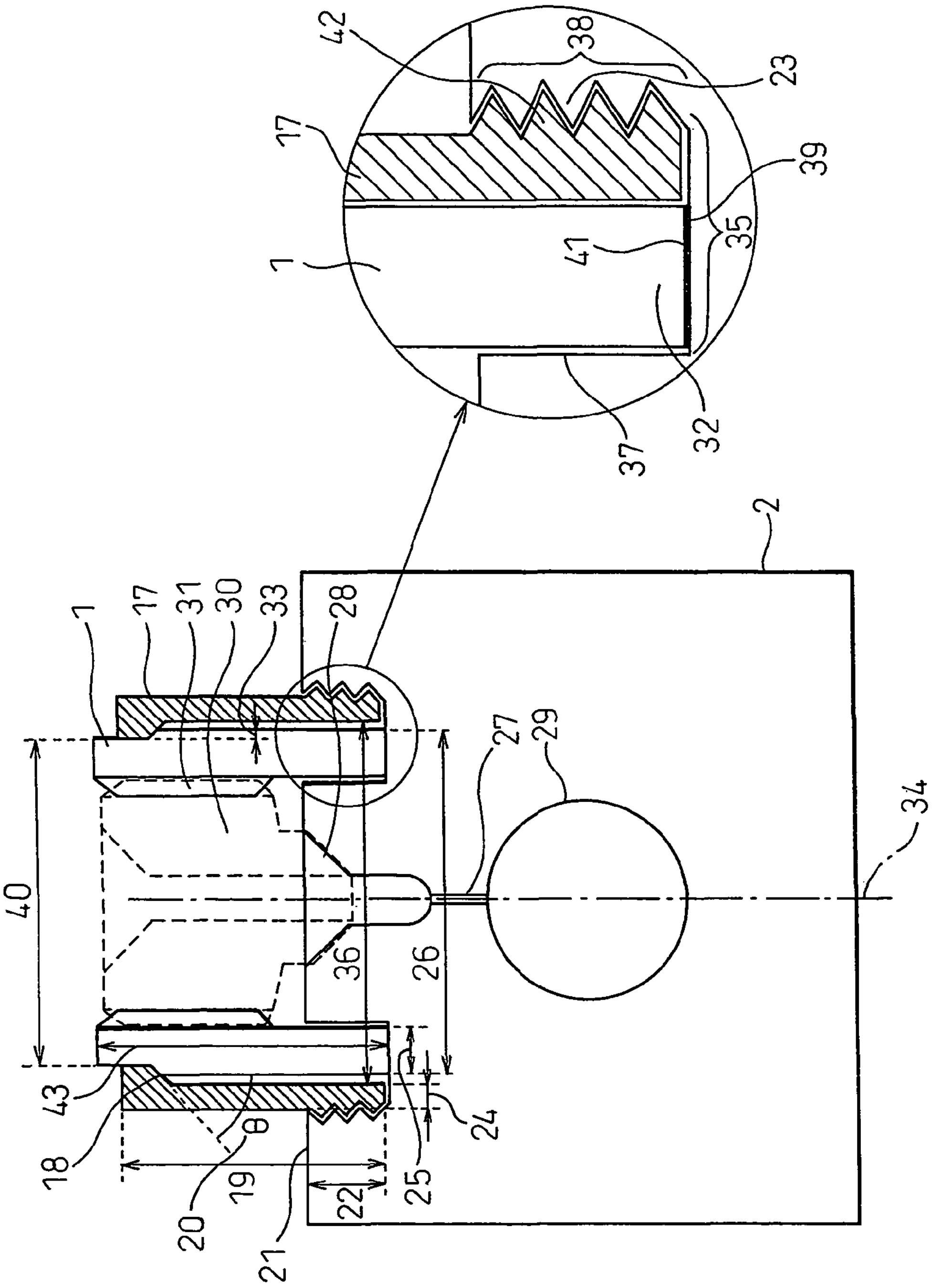
FIG. 11 is a view showing the cross-sectional structure of an automobile-use high pressure fuel injection accumulator-distributor in the width direction and a partially enlarged cross-sectional structure.

FIG. 11 shows the cross-sectional structure when cutting the common rail in the width direction at the cross-section of the holder axial center and shows the shape of the reinforcing screw member 3 and the shoulder part 4 at each holder side.

In FIG. 1 and FIG. 11, the rail body 2 has a center bore 29 inside it in the rail axial direction. Further, it has orifices 27 for fuel distribution in a direction perpendicular to the axial direction of the center bore 29 in the illustrated example. The angle formed by the center bore 29 and the orifices 27 may be suitably changed in accordance with the strength of the material to reduce the degree of concentration of stress. It has no effect on the scope of application of the present invention and the realization of its effects.

Note that here, the present invention will be explained with reference to the example of the common rail shown in FIG. 1 and FIG. 11, but the shape of the rail body of the fuel accumulator is basically not limited. The cross-section of the rail body may be rectangular like in this example or may be circular. It may be suitably changed in accordance with the convenience in supply of fuel to the engine and layout of the pipes. However, the center bore and the branched tube structure are essential.

Further, the surface 21 of the rail body at the side to which the holders are joined preferably has a surface roughness Rmax of 100 μm or less. For this purpose, this surface is preferably machined.

Further, this surface 20 is precision formed with guide grooves 35 for precision engagement with the holders 1 at the necessary positions, seat faces 28 for obtaining a reaction force by the internal threads 31 formed at the inner circumferences of the holders and for metal touch sealing the front ends of the connection parts 30 connecting the rail body and the fuel distribution pipes etc. These surfaces are also preferably all processed with the same precision.

This is a preferable requirement for safely realizing the effect of use of the reinforcing screw members 17 of the present invention.

Each holder 1 is made from a small diameter tube part at the pipe side and a large diameter part at the rail body side. A shoulder part 18 forming a step is provided between these. Overall, it is formed to have a coaxial two-step cylindrical outside shape. Further, it has an internal thread 31 at its inside circumference. This thread is used to connect the pipe connection part 30 to the rail body 2 by a metal touch seat face 28.

In the present invention, each holder 1 and the rail body 2 are joined at the rail side end 32 of the holder by liquid phase diffusion bonding or resistance welding or a joining method combining the same performed at 1000° C. or more to assemble the common rail. This assembly type common rail is still not industrially popular. The reason is that the technology for obtaining industrial level reliability of the joint of the holder and rail body is still not perfected.

Therefore, in the present invention, after joining when the joining is completed and later heat treatment is not required or after heat treatment when heat treatment is necessary after joining, to improve the joint strength of the joint of each holder 1 and rail body 2, a reinforcing screw member 17 having an inner circumferential shape fitting over the small diameter tube part and shoulder part 18 of the holder 1 in a turnable manner, having an external thread 42 engaging with an internal thread 23 of a rail body guide groove 35, and having a dimension 19 in the holder axial direction not exceeding the holder dimension 43 is fit over the holder 1, screwed into the internal thread 13 of the rail body guide groove 35, and further fastened.

By doing this, the present invention can provide a common rail having a structure enabling the generation of compressive stress at the shoulder part 18 of each holder, transmission of this to the joint faces 41 by the rigidity of the holder 1, and imparting of permanent compressive stress to the joint faces 41 of the guide groove bottom 39 of the rail body with the holder and, further, can provide a method of production of a common rail assembled using reinforcing screw members 3.

The protruding part 33 of the shoulder part of each holder side is preferably 0.5 mm or more at one side. In this case, when the cross-sectional area of the shoulder part perpendicular to the direction of the cylindrical axial center 34 of the holder and the similar cross-sectional area of the reinforcing screw member (here, meaning the cross-sectional area at the parallel part between the shoulder part and the external thread in the sense of the cross-sectional area transmitting stress in the cross-section of the reinforcing screw member) can be made sufficiently large, if the yield strength of the reinforcing screw member 17 is sufficient, the joint faces 41 can be given the necessary compressive residual stress.

The thickness 24 of the parallel part between the shoulder part and external thread of each reinforcing screw member 17 is preferably made 0.5 mm or more since the reaction force received by the shoulder part of each holder is received through the internal thread 23 provided in the outer circumferential wall 38 of the guide groove 35 at the rail body (structurally a limited depth, as explained later, preferably 3 to 5 mm).

The shape of this internal thread 23 is not particularly limited, but the pitch and thread height for preventing the external thread 42 of each reinforcing screw member 17 from breaking or drawing should be determined in accordance with the characteristics of the material.

The thread length of the external thread 42 of each reinforcing screw member 17 and the thread length 22 of the internal thread 23 of each guide groove outer circumferential wall (substantially matching the depth of the guide groove 35 at the rail body side in some cases) are preferably 3 mm or more. For example, when it is not possible to secure a 0.5 mm pitch engagement thread of five turns or more, the stress applied to each thread becomes too high and breakage of the thread becomes a concern. These values are all recommended values obtained by geometric calculations, estimations of stress, and actual experiments.

Further, the same is true for the shape of the external thread 42 at the end of each reinforcing screw member 17 at the rail body side. If the thread length 22 is 3 mm or more, the thread can reliably receive the reaction force due to screwing in by the fastening fixture.

Note that when making the groove depth 5 mm or more, the center bore 29 passing through the inside of the rail body and the guide groove bottoms 39 become close. The distance between the corner parts where the guide groove bottoms 39 and inner circumferential wall 37 become close and the center bore 29 becomes a factor determining the stress in the circumferential direction of the rail body 2. From this, to eliminate the possibility of breakage connecting the two occurring, the guide grooves 35 are preferably given a depth of 5 mm or less. However, this value sometimes changes in accordance with the characteristics of the material of the rail body in the present invention.

The thickness 25 of each holder 1 at the rail body side is not limited. However, it is preferable to provide a clearance of 0.2 mm or more between the outside wall of the holder 1 at the rail body side and the inside diameter of the reinforcing screw member 17. This is so as to avoid a situation where the reinforcing screw member 17 cannot be fastened until completely engaging with the shoulder 18 of the holder 1 when the holder 1 plastically deforms and the joint end 32 side projects out to the outer circumference side in the joining or other production steps.

Note that in order for the above precision shaped parts to exhibit their full functions, as explained later, the surface 21 of the rail body to which the holders are joined, including the grooved surfaces, is desirably machined to a roughness of an Rmax value of 100 μm or less. This processing enables the effects of the present invention using the reinforcing screw members to be sufficiently exhibited.

The position of the shoulder part 18 provided at the holders 1 is not particularly limited, but if at least 10 mm from the end face at the rail body 2 side, the situation where the thread and the shoulder part overlap in the axial direction and a sufficient engagement length cannot be secured can be avoided. Further, in each reinforcing screw member 17, the length from the location of engagement with the shoulder part of the holder to the top end is also not limited, but an axial direction length 19 of the reinforcing screw member not exceeding the holder axial direction length 43 is preferable since there would then be no difficulty in laying the piping parts of the common rail.

The stress applied to each holder 1 becomes the combination of the (a) tensile stress to the joint faces 41 of the holder formed with a fastening torque of the pipe connection part 30 and holder 1 of about 30 kN (about 100 MPa) and the (b) stress in the direction drawing the holder formed when an internal pressure of a maximum 200 MPa or so is applied (about 20 to 50 MPa), that is, 120 to 150 MPa. When no internal pressure is applied, a 100 to 150 MPa stress cycle is applied to the welded joint faces. In the prior art, this stress was borne by the joint faces as it was.

The present invention is characterized by the use of the reinforcing screw members 17 as means to reduce the stress. Further, if the fastening torque of each reinforcing screw member is made the sum of the highest load stress on the joint faces occurring when internal pressure is applied to the rail body and the fastening force when connecting the fuel distribution pipe by a metal touch seal or more, that is, if applying the 120 to 150 MPa compressive stress to the joint faces 41 of the holder 1 and rail body 2 by the fastening force of the reinforcing screw member 3, compressive stress can be added to the joint faces 41 at all times even when the internal pressure fluctuates. As a result, substantially no tensile stress due to fluctuation of the internal pressure occurs at the joint faces 41 or even if any tensile stress occurs, it can be kept to a tensile stress of the fatigue limit or less.

Further, even when the fastening torque falls during the operation of the common rail, due to the anchor effect due to the shape of the thread part, it is clear that the stress when each reinforcing screw member 17 detaches from the rail body 2 becomes higher than the case where there is no reinforcing screw member.

For this reason, the joint of each holder 1 and rail body 2 obtained by joining can be said to be free from the concern of fatigue breakage from the joint. Unless the reinforcing screw member 17 completely breaks and falls off or all of the thread of the reinforcing screw member 17 is lost due to fatigue breakage, there is no possibility of detachment from the rail body.

Further, this joint inherently has the joint strength obtained by the joining. Regarding this strength, for example, the fact that the joint coefficient is an extremely high one of 80% or more of the strength of the base material if using liquid phase diffusion bonding or other integral joining technology using diffusion movement of substances was clarified by the inventors as a result of research.

For this reason, even if there are defects, the joint will have a long fatigue breakage life and breakage from the joint will not easily occur, therefore so long as using the reinforcing screw member 17, the joint strength between the rail body and each holder will become reliably higher compared with the case of not using a reinforcing screw member. This effect is particularly remarkable in the case of using liquid phase diffusion bonding alone and using it together with other joining compared with the conventional welded common rail.

Note that during operation of the common rail, even when a situation arises where the fastening torque of a reinforcing screw member falls due to vibration etc. of the engine or chassis, sufficient fastening torque can be imparted again at the time of periodic inspection etc. to restore the compressive residual stress to the weld zone. This point is also a characteristic feature of the present invention.

As a material characteristic of each reinforcing screw member 17, the ability to absorb both the stress generated due to the fastening torque of the pipe connection part 30 and the stress due to fluctuations in the internal pressure within the plastic limit is necessary. Therefore, the reinforcing screw member 17 preferably has a yield strength of 300 MPa or more comprised of the maximum stress generated multiplied with the general safety coefficient 2 of fatigue.

In the present invention, further, an industrial safety margin of about 1.3 is provided. A yield strength of 400 MPa as a yield strength by which it is estimated that fatigue breakage will not occur even with the lowest thickness of 0.5 mm is set as a preferable mechanical characteristic of each reinforcing screw member.

Further increasing the yield strength of each reinforcing screw member by selecting the material and heat treatment conditions would naturally be effective, but when producing an extremely high strength reinforcing screw member by cutting, since the reinforcing screw member is shaped resulting in extremely large scraps, the cost rises. Further, due to the deterioration in cuttability, the productivity falls. Due to this, there is a limit to the improvement of the yield strength. On the other hand, the upper limit of the thickness of the reinforcing screw member is not set in the present invention, but the thickness of the reinforcing screw member should be suitably determined considering the reduction of weight of the rail body and the rigidity of the reinforcing screw member and further considering the balance of the shape, cost, productivity, the safety margin of the fastening parts etc.

A common rail produced by a forming, assembly, and bonding process, compared with a conventional integrally formed common rail, is extremely cost competitive from the viewpoint of the productivity. Further, compared with a conventional welded common rail, the joints have sufficient reliability and can withstand even extremely high internal pressure specifications of 200 MPa or more.

If estimating the state of stress of the parts of the common rail at the time of design, when the rail body has a yield strength of 1000 MPa or more after joining, a common rail superior in fatigue durability at a 200 MPa internal pressure can be obtained.

Note that the outside wall of each holder 1 has to be provided with a shoulder part 18 engaging with the reinforcing screw member 17. The angle θ (6 in the figure) required for the shoulder part 18 and the thickness 24 of the reinforcing screw member 17 are found by the following experiment.

Each reinforcing screw member 17 was produced by cutting from a steel material having a yield strength of 490 MPa. At this time, the angle θ of the shoulder part 18 of the holder from the parallel part of the outside wall of the holder at the height of 20 mm was changed from 10° to 90°.

Next, the inside shapes of reinforcing screw members engaging with this without clearance were processed to change the thicknesses 24 of the reinforcing screw members 17 from 0.2 mm to 6 mm. These were screwed in, then the holders 1 were pulled in a direction perpendicular to the joint faces 41 using a tensile tester to obtain a stress-strain (represented by elongation of holder 1 in axial center direction 34) curve.

At this time, the stress-strain curve shows a linear correlation while the stress is small in value, but when reaching a certain value, deviates from the linear rule. The increase in strain becomes larger compared with an increase in stress, that is, plastic deformation begins. This plastic, deformation start point, that is, elastic limit, is referred to in the present invention as the "plastic deformation start stress at the time of holder drawing".

As already explained, it is known that if the fastening torque of a pipe connection part 30 to a holder 1 is about 30 kN, leakage of fuel and a drop of pressure can be prevented. Therefore, the load applied to a joint by this and the internal pressure divided by the area of the joint faces of the holder 1 become permanent stress and fluctuating stress applied to the joint faces. Further, if calculating the stress distribution from these values, it may be concluded that a joint type common rail will never break from a joint if the plastic deformation start stress at the time of drawing of the holder 1 is 200 MPa or more.

Figure 12:
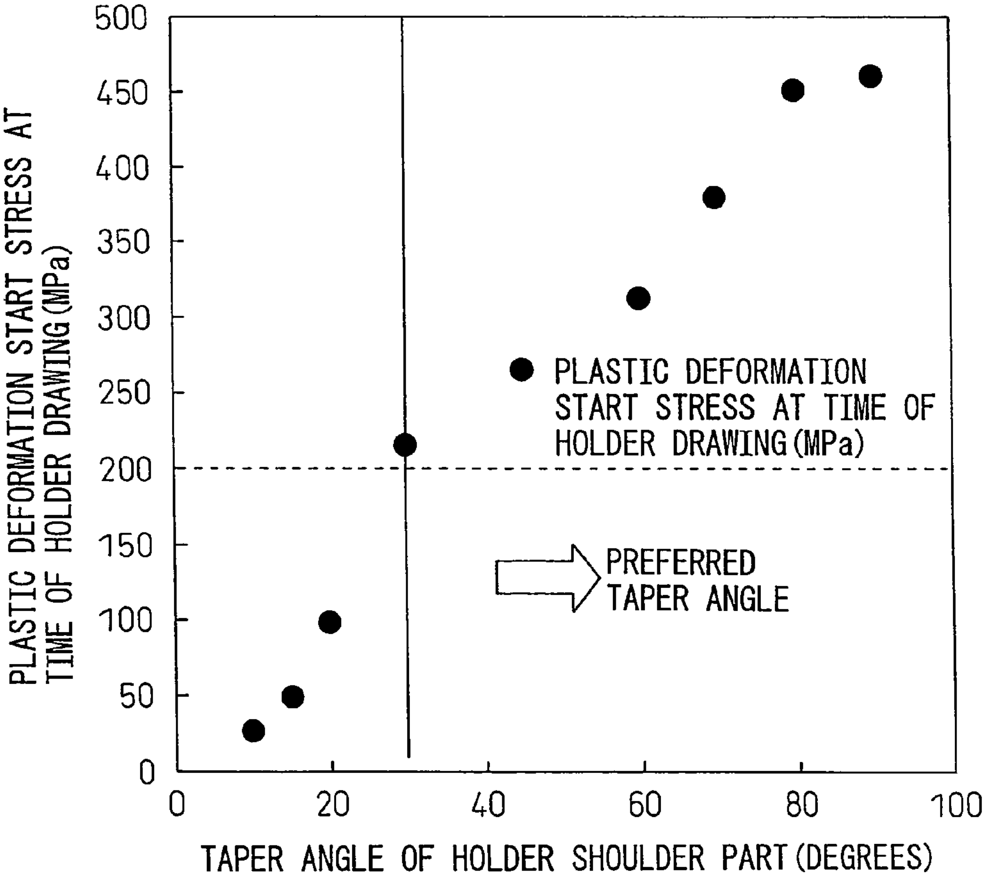
FIG. 12 is a view showing the relationship between the taper angle θ of a shoulder part of a pipe attachment holder and the plastic deformation start stress at the time of drawing the holder.

Therefore, the inventors used this value as the threshold value and investigated the relationship between the taper angle θ of the shoulder part 18 (same as taper angle of engaging part of reinforcing screw member 17 having inner surface shape) and the thickness 24 of the reinforcing screw member 17. FIG. 12 shows the relationship between the taper angle θ of the shoulder part and the plastic deformation start stress at the time of holder drawing. It is learned that if the taper angle θ exceeds 30°, the plastic deformation start stress at the time of holder drawing is 200 MPa or more.

Figure 13:
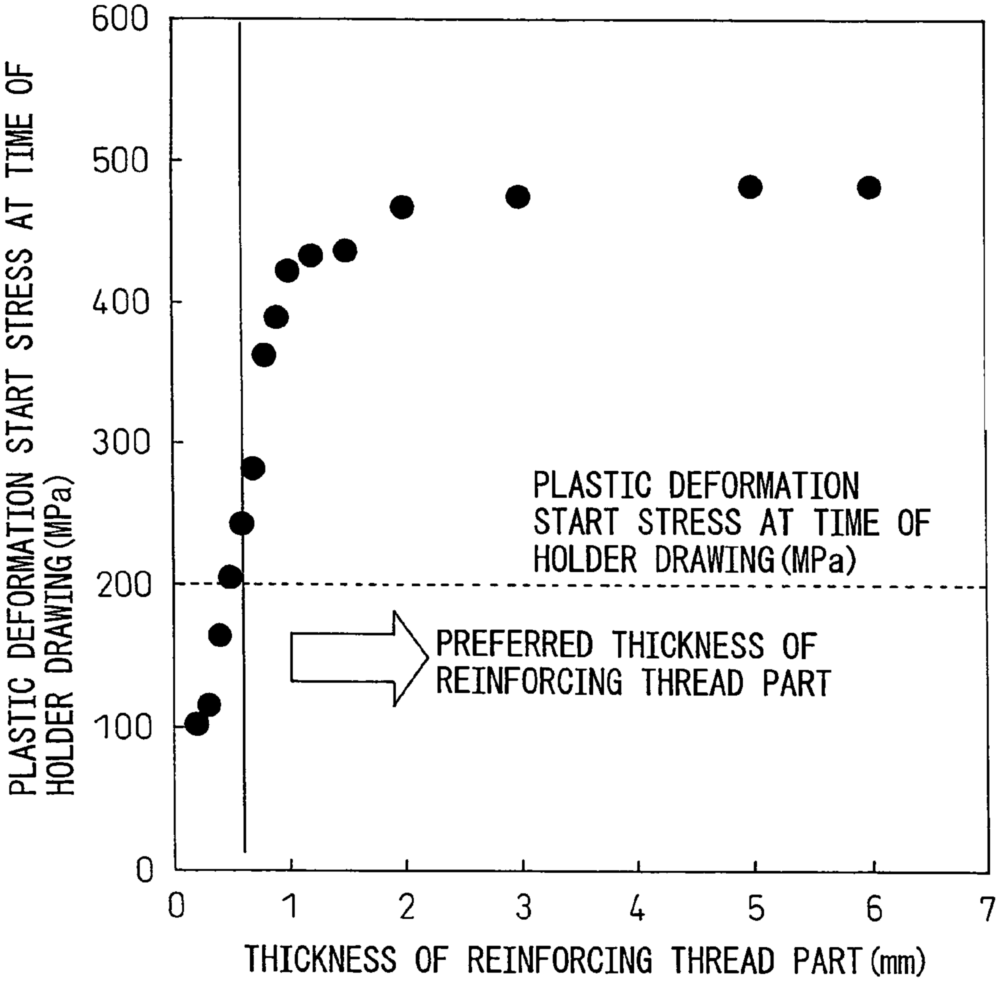
FIG. 13 shows the relationship between the thickness of the reinforcing screw member and the plastic deformation start stress at the time of drawing the pipe attachment holder.

Similarly, FIG. 13 shows the relationship between the thickness of one side of a reinforcing screw member and the plastic deformation start stress at the time of drawing. It is learned that if the thickness is 0.5 mm or more, the plastic deformation start stress at the time of drawing is 200 MPa or more.

EXAMPLES

Below, examples of the present invention will be explained.

Example 1

This is an example of the aspects of the invention of claims 1 to 5.

The common rail shown in FIG. 1 was produced as follows as a prototype. That is, a 230 mm long, 30 mm square rail body and branch pipe connection holders for distribution of fuel each having a 24 mm outside diameter and a thickness of 5 mm and having a thread of a maximum thread height of 2 mm at the inside diameter side of the holder were produced using steel sheet or steel bars having the chemical ingredients shown in Table 1 by rolling, drawing, cutting, etc.

The rail body, as shown in FIG. 3, was formed with guide grooves for holder engagement of a depth of 3 mm. Each holder end, as shown in FIG. 3, was provided with a skirt of a taper angle of 15° and a height of 3 mm. The outer wall of the rail side groove facing this was ground to give a skirt taper of the same 15°. The groove shapes were adjusted so that the distance between the outer wall of the rail side groove and the outer surface of the holder end skirt became 0.5 mm.

The rail body and the holders were joined by liquid phase diffusion bonding and electrical resistance welding, friction welding, or combined joining technology of the same. By the cooling after joining or by heat treatment, the material strength was made 1200 MPa. In the clearance between the outside walls of the holders and the outside walls of the rail grooves, steel rings of a thickness of 0.5 mm and a height of 3 mm were press fit by a pressure of 800 MPa for the purpose of leaving compressive stress at the holder joints and thereby assemble the common rail.

Figure 14:
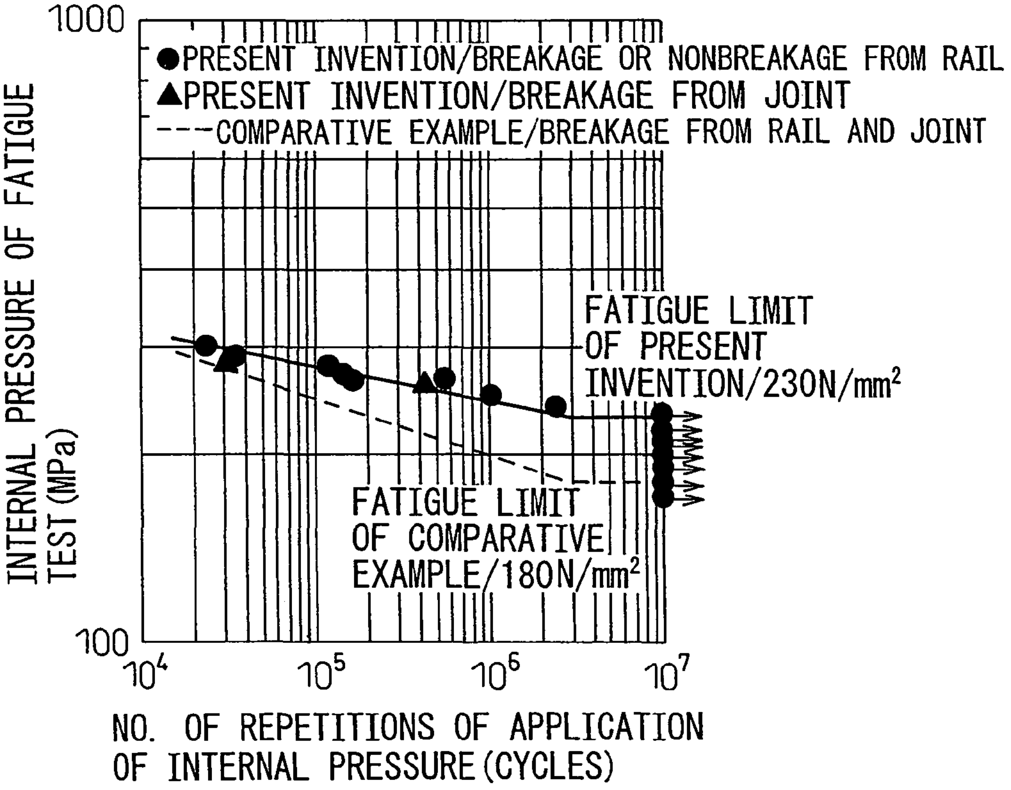
FIG. 14 is a view comparing the results of an internal pressure fatigue test of an automobile-use high pressure fuel injection accumulator-distributor produced by a method of the present invention and the results of the prior art.

The inventors ran experiments on drawing of the holders after assembly and found that at the time of drawing, the produced common rail can withstand a 10 million cycle fatigue test at a maximum 220 MPa internal pressure is shown in FIG. 14.

In the figure, the results of a welded common rail not provided with projecting parts like in the present invention are also shown as a representative curve for comparison. The fatigue limit of the stress drops slightly, but this is because there is data of breakage from the joint at 3.72 million cycles and 5.61 million cycles as values of the fatigue limit. It is clear that the reliability of the strength in the joints of the common rail assembled in the present invention is improved over the prior art.

TABLE 1

(mass %)

| Steel code | C | Si | Mn | Cr | Mo | Ni | Nb | V | N | B | Ca |
|---|---|---|---|---|---|---|---|---|---|---|---|
| A | 0.340 | 0.20 | 0.60 | 1.40 | 0.50 | 0.40 | 0.0500 | 0.0600 | 0.0070 | | 0.0024 |
| B | 0.180 | 0.45 | 0.45 | 2.30 | 1.12 | 0.26 | 0.0700 | 0.0300 | 0.0060 | | 0.0015 |
| C | 0.120 | 0.35 | 0.56 | 3.25 | 0.62 | | 0.0400 | 0.2500 | 0.0120 | 0.0009 | 0.0021 |

plastic deformation start stress (elastic limit) was 450 MPa in terms of the value of the drawing force divided by the area of the steel ring as seen from the holder axial direction before press-fitting. In this case, the steel material of the steel ring was SM490 steel of JIS G 3106. The yield stress as worked before press-fitting was 364 MPa. That is, the steel ring was work hardened by the press-fitting.

Further, the completed common rail was set in an internal pressure fatigue test apparatus through separately prepared and attached fastening fixtures and subjected to an internal pressure fatigue test at a maximum injection pressure of 3000 atm, 15 Hz, and 10.00 million cycles. In the test, the screws for blocking the open ends of the holders were selected to match with the shapes of the threads formed at the inside diameter sides of the holders and were fastened by a maximum torque of 3 tons to recreate the environment of use in an actual engine.

The relationship between the number N of repetitions of application of internal pressure until fatigue breakage and the joint stress calculated from the applied pressure is shown in FIG. 14 as the internal pressure-fatigue breakage life curve. In this case, the maximum pressure applied to the joint is determined by the shape and the internal pressure, but the joint maximum main stress generated at an internal pressure of 200 MPa can be estimated as being 190 MPa. Further, similarly, with an internal pressure of 300 MPa, it can be estimated as being 270 MPa.

In the results shown in FIG. 14, the black dots show the breakage from the rail body, the black dots with the arrows show no occurrence of fatigue breakage even at 10 million cycles, and, further, the black triangles show the breakage from the joint of a holder and rail body.

The actual internal pressure applied to the common rail is the maximum in the internal pressure envisioned as 220 MPa. According to the data shown in FIG. 14, the pressure at the fatigue limit can be read as being 230 MPa. The fact that a Example 2

This is an example of the aspects of the invention of claims 5 to 10.

The common rail shown in FIG. 1 was produced as follows as a prototype. That is, a 230 mm long, 30 mm square rail body and branch pipe connection holders for distribution of fuel each having a 24 mm outside diameter and a thickness of 5 mm and having a thread of a maximum thread height of 2 mm at the inside diameter side of the holder were produced using steel sheet or steel bars having the chemical ingredients shown in Table 2 by rolling, drawing, cutting, etc.

The rail body, as shown in FIG. 6, was formed with guide grooves for determining the holder joining positions of a depth of 3 mm.

In FIG. 6, (a) shows the rail body, while (b) shows a holder joint by an enlarged view. Both holders with holder ends, as shown in FIG. 7 and FIG. 8, provided in advance with a projecting part and not provided with a projecting part were prepared.

In FIG. 7, (a) shows the State A, that is, the state as welded, (b) shows the State B, that is, the state where stress is applied right after joining, the joint face plastically deforms, and the outside wall of the holder starts to protrude out to the rail slit, and (c) shows the State C, that is, the State B where stress is further applied and in the state with temperature at 1000° C. or more, the projecting part completely fills the slit and the shaping is completed.

In FIG. 8, (a) shows the State A, that is, the state as joined, (b) shows the State B, that is, the state where stress is applied right after joining, the joint end plastically deforms, and the pre-processed projecting part protrude out to the rail slit, and (c) shows the State B, that is, the state where stress continues to be further applied and in a state with the temperature at 1000° C. or more, the projecting part completely fills the slit and the shaping is completed.

Note that in FIG. 8(*b*), the hatched part shows the protruding part 8'. Similarly, in FIG. 8(*c*), the hatched part shows the protruding part 8". The pre-processed projecting part fits in the slit.

At the step shown in FIG. 7 or FIG. 8, the holders and rail body are joined by liquid phase diffusion bonding or resistance welding or a combination of resistance welding and liquid phase diffusion bonding.

While confirming that the residual heat right after joining (in the case of composite joining, at the time of the initial resistance welding) caused the joint end of the holder to be 1000° C. or more by measuring the temperature of the outside wall of the holder 0.2 mm higher than the position of the surface of the rail body by a radiant thermometer, stress was applied from the end face of the holder at the opposite side to the joint face. The amount of reduction of the holder height set in advance by separate measurement was measured by the displacement of the crosshead of the holder. It was confirmed that the plastic deformation of the holder end reached the required deformation in the case where the projecting part was provided in advance and in the case where it was not provided, the stress was removed, then the parts were cooled. It was confirmed that the holder height satisfied the required specifications.

The stress applied to form the projecting part at this time or to make the projecting part completely engage with the recess in the groove outer circumferential wall of the rail body was, in terms of the stress applied to the holder, 18 MPa in the case of resistance welding and 15 MPa in the case of liquid phase diffusion bonding.

Further, the common rail as a whole was reheated in an inert atmosphere to 1150° C., held there for 10 minutes, then normalized and tempered to thermally refine the structure and raise the tensile strength of the common rail to 1000 MPa so as to be able to withstand a 200 MPa internal pressure fatigue.

Twenty common rails produced under exactly the same conditions were produced. One was cut along the width direction of the common rail through the axial center of a holder. The amount of increase at one side of the projecting part at the two ends of the holder joint with respect to the outside diameter of the groove outer circumferential wall of the rail body when the projecting part is engaged in the recess of the groove outer circumferential wall of the rail body was confirmed by measurement to be in the range of 1.12 to 1.47 mm.

While the outside diameters of all of the holder projecting parts of one common rail fluctuated in this range, they never fell below 1.0 mm. The holder ends were processed so that the heights of the holder projecting parts became 2.0 mm. The amount of increase at one side before joining the outside diameter of the projecting part and the outside circumferential diameter of each holder was controlled to 1.1±0.05 mm. Despite the processing of the projecting parts of the holder ends, the recess of the groove outer circumferential wall of the rail body was processed to a margin of 1.1±0.05 mm by plastic deformation of the holder end.

The taper angle of the projecting part of each holder end connected with the outer circumferential surface of the holder body was made 60°. The recess of the groove outer circumferential wall of the rail body engaging with this was given the same but opposite taper. Note that the clearance between the outside diameter of the rail body outer circumferential wall and the outside diameter of the holder was made 1.2 mm at one side when providing the projecting part in advance and 1.0 mm when not forming the projecting part in advance.

The inventors ran tests to evaluate the drawing of holders of the common rail assembled by the above process. They measured the drawing stress by dividing the drawing force by the area of the holder at the end not joined. When measuring the stress at the point where the deformation changed from elastic to plastic deformation, it was 400 MPa.

Further, 10 or more completed common rails were set in an internal pressure fatigue test apparatus through separately prepared and attached fastening fixtures and subjected to an internal pressure fatigue test at a maximum injection pressure of 300 MPa, 15 Hz, and 10.00 million cycles. In the test, the screws for blocking the open ends of the holders were selected to match with the shapes of the threads formed at the inside diameter sides of the holders and were fastened by a maximum torque of 3 tons to recreate the environment of use in an actual engine.

Figure 15:
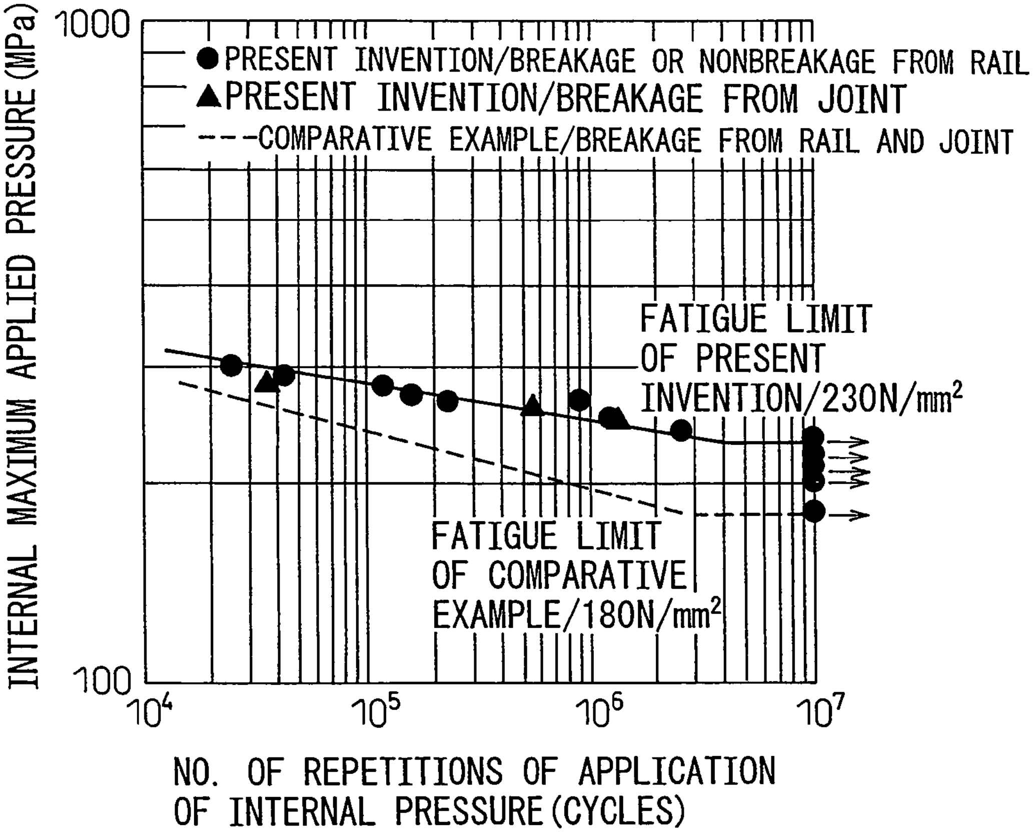
FIG. 15 is a view comparing the results of an internal pressure fatigue test of an automobile-use high pressure fuel injection accumulator-distributor produced by another method of the present invention and the results of the prior art.

The relationship between the number N of repetitions of application of internal pressure until fatigue breakage and the joint stress calculated from the applied pressure is shown in FIG. 15 as the internal pressure-fatigue breakage life curve. In this case, the maximum pressure applied to the joint is determined by the shape and the internal pressure, but the joint maximum main stress generated at an internal pressure of 200 MPa can be estimated as being 190 MPa. Further, similarly, with an internal pressure of 300 MPa, it can be estimated as being 270 MPa.

In the results shown in FIG. 15, the black dots show the breakage from the rail body, the black dots with the arrows show no occurrence of fatigue breakage even at 10 million cycles, and, further, the black triangles show the breakage from the joint of a holder and rail body.

The actual internal pressure applied to the common rail is the maximum in the internal pressure envisioned as 220 MPa. According to the data shown in FIG. 15, the pressure at the fatigue limit can be read as being 230 MPa. It is understood that a produced common rail can withstand a 10 million cycle fatigue test at a maximum 220 MPa internal pressure.

In the figure, the broken line shows the results when not providing projecting parts at the holders and when not providing recesses at the groove outer circumferential walls of the rail body as a representative line. The fatigue limit stress dropped slightly, but this is because data of breakage from the joints at 3.70 million cycles and 5.60 million cycles are included as values of the fatigue limit. It is clear that the reliability of the strength of the joint of the common rail assembled by the present invention is improved over the prior art.

TABLE 2

(mass %)

| C | Si | Mn | Cr | Mo | Ni | Nb | V | N | B | Ca |
|---|---|---|---|---|---|---|---|---|---|---|
| 0.180 | 0.20 | 0.45 | 4.56 | 0.50 | 0.40 | 0.0500 | 0.0600 | 0.0070 | 0.0018 | 0.0024 |

Example 3

This is an example relating to the aspects of the invention of claims 11 to 16.

The common rail shown in FIG. 1 was produced as follows as a prototype. That is, a rail body having a length of 230 mm, a width of 40 mm, and a thickness of 30 mm and holders of branch pipe attachments for distribution of fuel each having a height of 25 mm, an outside diameter of 24 mm, and a thickness of 4 mm and having a thread of a maximum thread height of 2 mm at the inside diameter side of the holder were produced using steel sheet or steel bars having the chemical ingredients shown in Table 3 by rolling, drawing, cutting, etc.

TABLE 3

(mass %)

| C | Si | Mn | Cr | Mo | Ni | Nb | V | N | B | Ca |
|---|---|---|---|---|---|---|---|---|---|---|
| 0.140 | 0.20 | 0.45 | 3.12 | 0.98 | 0.15 | 0.0500 | 0.2320 | 0.0070 | 0.0018 | 0.0024 |

The rail body, as shown in FIG. 11, was formed with guide grooves of a depth of 4 mm and a width of 7 mm for determining the holder joint positions. Further, the outer circumferences of the guide grooves were formed with threads of a maximum height of 1 mm and 0.5 mm pitch over a thread length of 4 mm.

The surface roughness was made 100 μm or less in terms of Rmax value. Each holder was provided with a shoulder part of an angle θ with the holder outer wall of 50° and a protruding width from the outside wall of the holder of 0.6 mm by machining at a position of 15 mm from the end face at the rail body side.

The reinforcing screw members were made using a steel material with a yield strength of 520 MPa. In this processing, the parallel parts were made a thickness of 2.5 mm and reverse tapered parts were provided at predetermined positions so as to engage with the shoulder parts of the holders without clearance. Further, the reinforcing screw members were formed at their outer circumferences at the rail body sides with external threads of thread lengths of 4 mm engaging with the internal-threads of the guide groove outer circumferential walls of the rail body by cutting. This processing was used to prepare the necessary number of reinforcing screw members.

Next, liquid phase diffusion bonding, resistance welding, or a combination of resistance welding and liquid phase diffusion bonding was used to join the rail body and the holders. The joining conditions at that time were as follows:

When joining a holder to the rail body by liquid phase diffusion bonding, the two types of joining foil shown in Table 4 were interposed between the holder and the rail body so as to be modeled on the shape of the joint faces, high frequency induction heating was used to raise the temperature at 10° C./s, the parts were held at 1150° C. for 10 minutes with a joining stress of 5 MPa applied from the beginning to end, then the heating was ended and nitrogen gas was blown over the parts at 0.5 $m^3$/min for cooling.

TABLE 4

(mass %)

| Foil type | Ni | B | Si | V | Fe |
|---|---|---|---|---|---|
| A | Bal. | 2.8 | 1.2 | 3.5 | 5.2 |
| B | 9.0 | 3.5 | 2.0 | 4.5 | Bal. |

When using resistance welding to join holders with the rail body, the holders were placed against the body in the state with the joined groove faces of the holder forming 60° V-grooves, then were run through with 150 mA/$mm^2$ current for 0.6 second and joined while applying 200 MPa stress.

Further, in the case of composite joining of resistance welding and liquid phase diffusion bonding, the angle of the groove faces was made an obtuse angle of 80°. A joining foil shown in Table 4 having a thickness of 30 μm was interposed between the groove faces. Under the same joining conditions as the joining conditions of the resistance welding alone, the parts were joined by resistance welding using liquid phase diffusion bonding foil (called "primary joining" and having the effect of eliminating the need for temporary attachment and application of stress at the time of liquid phase diffusion bonding), then heating in a 1250° C. furnace for 30 minutes for isothermal solidification of liquid phase diffusion bonding (called secondary joining), then taking the parts out from the furnace and spraying them with nitrogen gas at 0.5 $m^3$/min for cooling.

Primary and secondary bonding technology differ, so in the present invention, this joining process is called composite joining. The grooves and joint faces were processed to precisions all controlled to Rmax values of 100 μm or less.

Further, with joining using resistance welding, to secure the strength of the parts, thermal refining heat treatment (in practice, a quenching and tempering step where the joined parts were held in a resistance heating furnace at 950° C. for 30 minutes, then quenched in room temperature oil (cooling rate measured by thermocouple attached to part surface, cooling rate from 800° C. to 500° C. of average about 5° C./s), then held in a 650° C. resistance heating furnace for 30 minutes, then allowed to cool in the air) was performed, while with joining using liquid phase diffusion bonding, the parts were joined, then reinforcing screw members were screwed between the holder joining guide grooves provided in the rail and the outer walls of the holders, the shoulder parts and the inner surfaces of the reinforcing screw members were engaged, and the parts were tightened by a torque wrench so as to create a 400 MPa compressive residual stress at the weld joint faces.

This fastening force becomes at least the maximum stress of 150 MPa generated in the state where internal pressure is applied to the common rail.

A test for evaluating the drawing of the holders of the common rail assembled by the above steps was conducted using a tensile tester. The drawing stress comprised of the drawing force divided by the area of the end of the holder not joined was measured. The stress at the point where the deformation changed from tensile to plastic deformation was measured and found to be 540 MPa.

Further, the completed common rail was set in an internal pressure fatigue test apparatus through separately prepared and attached fastening fixtures and subjected to an internal pressure fatigue test at a maximum injection pressure of 300. MPa, 15 Hz, and 10.00 million cycles. In the test, the screws for blocking the open ends of the holders were selected to match with the shapes of the threads formed at the inside diameter sides of the holders and were fastened by a maximum torque of 30 kN to recreate the environment of use in an actual engine.

Figure 16:
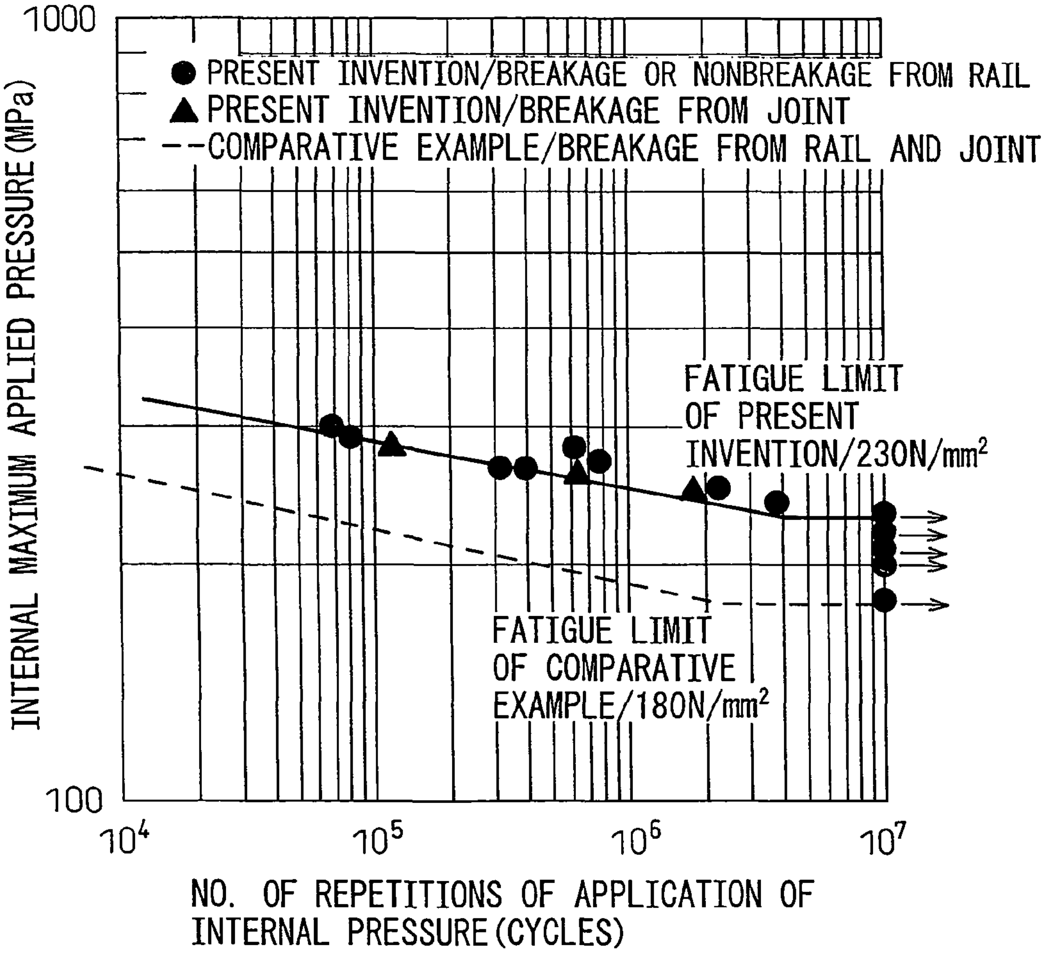
FIG. 16 is a view comparing the results of an internal pressure fatigue test of an automobile-use high pressure fuel injection accumulator-distributor produced by another method of the present invention and the results of the prior art.

The relationship between the number N of repetitions of application of internal pressure until fatigue breakage and the joint stress calculated from the applied pressure is shown in FIG. 16 as the internal pressure-fatigue breakage life curve. In this case, the maximum pressure applied to the joint is determined by the shape and the internal pressure, but the joint maximum main stress generated at an internal pressure of 200 MPa can be estimated as being 150 MPa. Further, similarly, with an internal pressure of 300 MPa, the joint maximum main stress can be estimated as being 200 MPa.

In the results shown in FIG. 16, the black dots show the breakage from the rail body, the black dots with the arrows show no occurrence of fatigue breakage even at 10 million cycles, and, further, the black triangles show the breakage from the joint of a holder and rail body.

The actual internal pressure applied to the common rail is the maximum in the internal pressure envisioned as 220 MPa. According to the data shown in FIG. 16, the pressure at the fatigue limit can be read as being 230 MPa. It is understood that a produced common rail can withstand a 10 million cycle fatigue test at a maximum 220 MPa internal pressure.

In the figure, the results of the internal pressure fatigue test of a common rail comprised of the same design as the case of not using any reinforcing screw-members are also shown as a representative curve. The fatigue limit of the stress drops slightly, but this is because data of breakage due to defects occurring in the joint or large sized inclusions at 2.2 million cycles and 4.6 million cycles are included as values of the fatigue limit. It is clear that the reliability of the strength in the joints of the common rail assembled in the present invention is improved over the prior art.

Note that there is no clear correspondence between the fatigue test results and the type of the joining method. No matter what the joining method, similar behavior is exhibited. Therefore, the results of the fatigue test shown in FIG. 16 show the results of liquid phase diffusion bonding alone, resistance welding alone, and liquid phase diffusion bonding and resistance welding combined.

INDUSTRIAL APPLICABILITY

As explained above, according to the present invention, when producing an automobile-use high pressure fuel injection accumulator-distributor in particular able to withstand a pressure of an internal pressure of over 120 MPa by assembly using liquid phase diffusion bonding or another joining method, it is possible to advantageously compensate for any drop in strength or breakage from a joint arising due to a joint defect inevitably arising in a joint.

Further, the situation where even if the joints of the common rail body and the holders formed by joining satisfy the tensile strength or other mechanical characteristics, minor defects unable to be confirmed by nondestructive inspection etc. and defects overlooked due to human error make it impossible to realize the characteristic of durability against pressure fatigue over a long period of time sometimes arises, but this situation can be prevented according to the present invention.

Therefore, the present invention has a high possibility of utilization in the automobile industry.

The invention claimed is:

1. An automobile-use high pressure fuel injection accumulator-distributor comprised of a rail body of the automobile-use high pressure fuel injection accumulator-distributor to which pipe attachment holders for attachment of fuel distribution pipes distributing fuel to injection nozzles at equal pressures are joined by liquid phase diffusion bonding or another joining method, said automobile-use high pressure fuel injection accumulator-distributor characterized in that each said holder is comprised of a tube part at the pipe side and a partial cone-shaped holder skirt (tapered part) at the end of the rail body side, each said holder skirt has a shape spreading in a partial cone shape toward the joint face end with an angle from the holder tube part side face of 10° or more in a range of a length of 2 mm or more in the holder axial direction at the outer circumference of the end of the holder at the joint face side, said rail body has holder joint position determining guide grooves at its holder joint positions, each said guide groove is comprised of a groove inner circumferential wall of a size enabling engagement with a holder joint inner circumference, a groove bottom forming a joint face with the holder, and a groove outer circumferential wall of a partial cone shape bulging out to the inner side parallel to the holder skirt from the groove bottom toward the holder side at a depth of 2 mm or more, and a metal ring is plastically deformed and press-fit into a clearance of 0.5 mm or more between each said holder skirt and said groove outer circumferential wall and parallel to the joint face, whereby a constant compressive stress is applied cold to the joint face.

2. An automobile-use high pressure fuel injection accumulator-distributor as set forth in claim 1, wherein said metal ring has a yield strength of 100 MPa to 500 MPa.

3. An automobile-use high pressure fuel injection accumulator-distributor as set forth in claim 1, characterized in that a plastic deformation start stress (elastic limit) at the time of drawing due to a composite force of a frictional resistance between a metal ring and the rail body or holder when said automobile-use high pressure fuel injection accumulator-distributor is subjected to internal pressure and a force acting to detach said holder and rigidity after plastic deformation and press-fitting of said metal ring is more than a maximum stress applied to the joint by the occurrence of the internal pressure.

4. A method of production of an automobile-use high pressure fuel injection accumulator-distributor joining pipe attachment holders for attachment of fuel distribution pipes distributing fuel to injection nozzles at an equal pressure to a rail body of the automobile-use high pressure fuel injection accumulator-distributor by liquid phase diffusion bonding or another joining method, said method of production of an automobile-use high pressure fuel injection accumulator-distributor characterized by:

forming each said holder to an outside shape comprised of a tube part at the pipe side and a partial cone-shaped holder skirt at the end of the rail body side so that said holder skirt has a shape spreading in a partial cone shape toward the joint face end with an angle from the holder tube part side face of 10° or more in a range of a length of 2 mm or more in the holder axial direction at the outer circumference of the end of the holder at the joint face side, forming said rail body to have, at each holder joint position, a holder joint position determining guide groove comprised of a groove inner circumferential wall of a size enabling engagement with a holder joint inner circumference, a groove bottom forming a joint face with the holder, and a groove outer circumferential wall of a partial cone shape bulging out to the inner side parallel to the holder skirt from the groove bottom toward the holder side at a depth of 2 mm or more and at a distance from the holder skirt of 0.5 mm or more parallel to the joint face, then joining each said holder and said rail body by said liquid phase diffusion bonding or another joining method and further applying predetermined heat treatment, then plastically deforming and press-fitting a metal ring having the same inside diameter as the outside diameter of the holder tube part or having an inside diameter with an added clearance of 0.5 mm or less and having a thickness of 0.5 mm or more into a clearance of each said holder skirt and groove outer circumferential wall cold so that the joint faces are given constant compressive stress.

5. A method of production of an automobile-use high pressure fuel injection accumulator-distributor as set forth in claim 4, wherein each said metal ring has a height the same as a depth of a guide groove or a greater height.

6. An automobile-use high pressure fuel injection accumulator-distributor comprised of a rail body of the automobile-use high pressure fuel injection accumulator-distributor to which pipe attachment holders for attachment of fuel distribution pipes distributing fuel to injection nozzles at equal pressures are joined by liquid phase diffusion bonding or another joining method, said automobile-use high pressure fuel injection accumulator-distributor characterized in that each said holder has, at the end of its outer circumference at the joint face side, in a range of a length of 2 mm or more in the holder axial direction and around the entire circumference, a projecting part formed by the heat of said liquid phase diffusion bonding or other joining work and having an outside diameter 1 mm or more larger than the outer circumference of the body of the holder at each side, said rail body has holder joint position determining guide grooves at its holder joint positions, each said guide groove is comprised of a groove inner circumferential wall of a size enabling engagement with a holder joint inner circumference, a groove bottom forming a joint face with the holder, and a groove outer circumferential wall having a size of a depth of 3 mm or more from the groove bottom and giving a clearance to the holder outside diameter of within 1.5 mm at one side, and each said groove outer circumferential wall has a recessed part engaging with a projecting part of a holder outer circumferential surface at the joint face side end and increases a fastening force between said holder and rail body by an anchor effect due to engagement of said recessed part of the groove outer circumferential wall and said projecting part of the holder.

7. An automobile-use high pressure fuel injection accumulator-distributor as set forth in claim 6, characterized in that said holders and rail body are comprised of a steel material having a tensile strength at room temperature of 800 MPa to 1500 MPa and at 1000° C. or a higher temperature of 200 MPa or less, and a plastic deformation start stress (elastic limit) at the time of drawing of a holder caused when the fuel injection system is subjected to internal pressure of 200 MPa or more in the range up to 100° C.

8. A method of production of an automobile-use high pressure fuel injection accumulator-distributor joining pipe attachment holders for attachment of fuel distribution pipes distributing fuel to injection nozzles at an equal pressure to a rail body of the automobile-use high pressure fuel injection accumulator-distributor by liquid phase diffusion bonding or another joining method, said method of production of an automobile-use high pressure fuel injection accumulator-distributor characterized by:

forming said rail body to have, at its holder joint positions, holder joint position determining guide grooves each comprised of a groove inner circumferential wall of a size enabling engagement with a holder joint inner circumference, a groove bottom forming a joint face with the holder, and a groove outer circumferential wall having a size of a depth of 3 mm or more from the groove bottom and giving a clearance to the holder outside diameter of within 1.5 mm at one side, forming each said groove outer circumferential wall to have a recessed part having an outside diameter 1 mm or more larger at one side than the groove outer circumferential wall in a range of a length of 2 mm or more in the groove depth direction from the groove bottom and around the entire circumference, then joining each said holder to said rail body by said liquid phase diffusion bonding or another joining method during which, while the joint is exposed to a high temperature of 1000° C. or more, applying stress of 10 MPa or more to said holder as a whole for 0.1 to 60 seconds in addition to the time for application of stress required for the joining operation so as to thereby form, by hot plastic deformation, a projecting part having an outside diameter 1 mm or more larger at one side from the outer circumferential surface of the holder body in a range of length of 2 mm or more in the holder axial direction and around the entire circumference at the joint face side end of the outer circumference of the holder and engaging said projecting part with the recessed part of said groove outer circumferential wall to increase the fastening force between the holder and the rail body by the resultant anchor effect.

9. A method of production of an automobile-use high pressure fuel injection accumulator-distributor as set forth in claim 8, characterized by forming each said projecting part in advance at 1 mm or more at one side by machining, cold pressing or cold forging, hot forging or hot pressing and machining in combination and by making an angle formed by a holder outer circumferential surface at an inclined surface of said projecting part connected to a holder outer circumferential surface 45° or more.

10. A method of production of an automobile-use high pressure fuel injection accumulator-distributor as set forth in claim 8, characterized in that said holders and rail body are comprised of a steel material having a tensile strength at room temperature of 800 MPa to 1500 MPa and at 1000° C. or a higher temperature of 200 MPa or less, and a plastic deformation start stress (elastic limit) at the time of drawing of a holder caused when the fuel injection system is subjected to internal pressure of 200 MPa or more in the range up to 100° C.

11. An automobile-use high pressure fuel injection accumulator-distributor comprised of a rail body of the automobile-use high pressure fuel injection accumulator-distributor to which pipe attachment holders for attachment of fuel distribution pipes distributing fuel to injection nozzles at equal pressures are joined by liquid phase diffusion bonding or another joining method, said automobile-use high pressure fuel injection accumulator-distributor characterized in that said rail body has cylindrical guide grooves at holder joint positions, each said guide groove is comprised of an inner circumferential wall of a diameter enabling engagement with an inner circumference at the joint side of a holder, a bottom surface forming a weld joint surface with the holder, and an outer circumferential wall formed with an internal thread, each said holder has a small diameter tube part at the pipe side, a step part forming a shoulder part at the middle, and a large diameter tube part at the rail body side to give it a coaxial two-step cylindrical outside shape, a reinforcing screw member having an inside surface shape fitting over said small diameter tube part and shoulder part of each said holder to freely turn around them, having an external thread screwed into an internal thread of a guide groove of said rail body, having a holder axial direction dimension not exceeding the holder dimension is fit over each said holder, and each said reinforcing screw member is fastened to impart compressive stress to the joint faces of the bottoms of the guide grooves of the rail body with the holders.

12. An automobile-use high pressure fuel injection accumulator-distributor as set forth in claim 11, wherein each said shoulder part has a taper of 30 to 90° with the parallel part of the outer circumferential wall of the holder.

13. An automobile-use high pressure fuel injection accumulator-distributor as set forth in claim 11, wherein each said reinforcing screw member has a yield strength of 400 MPa or more.

14. A method of production of an automobile-use high pressure fuel injection accumulator-distributor joining pipe attachment holders for attaching fuel distribution pipes for distributing fuel to injection nozzles at an equal pressure to a rail body of the automobile-use high pressure fuel injection accumulator-distributor by liquid phase diffusion bonding or another joining method, said method of production of an automobile-use high pressure fuel injection accumulator-distributor characterized by:

forming each holder joint position of a rail body with a cylindrical guide groove comprised of an inside circumferential wall of a size enabling engagement with a holder joint inner circumference, a bottom forming a welding joint surface with the holder, and an outer circumferential wall having an internal thread, joining each holder with a coaxial two-step tube shape provided with a small diameter tube part at a pipe side and a large diameter tube part at a rail body side and provided with a shoulder part forming a step part between them to the bottoms of the rail body using liquid phase diffusion bonding or another joining means, and fitting a reinforcing screw member having an inside surface shape fitting over said small diameter tube part and shoulder part of a holder to freely turn around them, having an external thread screwed into an internal thread of a guide groove of said rail body, having a holder axial direction dimension not exceeding the holder dimension over each said holder and screwing it into an internal thread of the guide groove of the rail body and further fastening it to generate compressive stress at the welded joint faces of the bottom of the guide groove of said rail body with the holder.

15. A method of production of an automobile-use high pressure fuel injection accumulator-distributor as set forth in claim 14, characterized in that a fastening torque of each said reinforcing screw member is made a sum of the highest load stress to the joint faces generated when internal pressure is applied to the rail body and the fastening force when connecting the fuel distribution pipe by a metal touch seal.

16. A method of production of an automobile-use high pressure fuel injection accumulator-distributor as set forth in claim 14, characterized by joining each said holder with said rail body, then performing heat treatment to thermally refine the joint, then fastening said reinforcing screw member.

* * * * *